United States Patent
Zhu et al.

(10) Patent No.: US 12,306,866 B2
(45) Date of Patent: May 20, 2025

(54) MULTIMEDIA RESOURCE CLASSIFICATION AND RECOMMENDATION

(71) Applicant: Tencent Technology (Shenzhen) Company Limited, Guangdong (CN)

(72) Inventors: Lingzi Zhu, Shenzhen (CN); Lianyang Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 277 days.

(21) Appl. No.: 17/992,541

(22) Filed: Nov. 22, 2022

(65) Prior Publication Data
US 2023/0084466 A1    Mar. 16, 2023

Related U.S. Application Data

(63) Continuation of application No. PCT/CN2022/072341, filed on Jan. 17, 2022.

(30) Foreign Application Priority Data

Jan. 27, 2021   (CN) .......................... 202110113770.7

(51) Int. Cl.
  *G06F 16/40* (2019.01)
  *G06F 16/43* (2019.01)
  *G06F 16/45* (2019.01)

(52) U.S. Cl.
  CPC .............. *G06F 16/45* (2019.01); *G06F 16/43* (2019.01)

(58) Field of Classification Search
  CPC ......... G06F 16/43; G06F 16/45; G06F 16/435
  See application file for complete search history.

(56) References Cited

U.S. PATENT DOCUMENTS

| 9,280,742 B1 * | 3/2016 | Sargin ..................... G06N 20/00 |
| 11,375,256 B1 * | 6/2022 | Dorner ..................... G06N 3/04 |

(Continued)

FOREIGN PATENT DOCUMENTS

| CN | 105975641 A | * | 9/2016 |
| CN | 112232510 A |   | 1/2021 |
| CN | 113590849 A |   | 11/2021 |

OTHER PUBLICATIONS

International Search Report and Written Opinion received for PCT Patent Application No. PCT/CN2022/072341, mailed on Apr. 13, 2022, 15 pages (7 pages of English Translation and 8 pages of Original Document).

*Primary Examiner* — Mahesh H Dwivedi
(74) *Attorney, Agent, or Firm* — ArentFox Schiff LLP

(57) ABSTRACT

A multimedia resource classification model training method includes acquiring an attribute information set and a training label set of training multimedia resources. The method further includes inputting the attribute information set into a multimedia resource classification model that includes a plurality of feature sub-networks and a plurality of task sub-networks. The multimedia resource classification model is configured to classify quality of multimedia resources. The method further includes vectorizing the attribute information to obtain attribute feature vectors and inputting the obtained attribute feature vectors into the plurality of task sub-networks to obtain prediction labels corresponding to the plurality tasks. The method also includes obtaining a trained multimedia resource classification model by adjusting parameters of the corresponding task sub-network and by adjusting model parameters of the corresponding feature sub-networks based on the training labels and prediction labels that correspond to a same task until a convergence condition is satisfied.

20 Claims, 17 Drawing Sheets

(56) References Cited

U.S. PATENT DOCUMENTS

| | | | |
|---|---|---|---|
| 2014/0298364 A1* | 10/2014 | Stepanov | H04N 21/4668 |
| | | | 725/10 |
| 2017/0169040 A1* | 6/2017 | Guan | G06F 16/78 |
| 2021/0160571 A1* | 5/2021 | Menendez | G06F 18/2413 |
| 2021/0192220 A1* | 6/2021 | Qu | G06V 10/764 |
| 2021/0248376 A1* | 8/2021 | Zhao | G06V 20/49 |
| 2021/0294847 A1* | 9/2021 | Yoon | H04N 21/4826 |

* cited by examiner

MULTIMEDIA RESOURCE CLASSIFICATION AND RECOMMENDATION

RELATED APPLICATIONS

This application is a continuation of International Application No. PCT/CN2022/072341, entitled "MULTIMEDIA RESOURCE CLASSIFICATION MODEL TRAINING METHOD AND MULTIMEDIA RESOURCE RECOMMENDATION METHOD," and filed on Jan. 17, 2022, which claims priority to Chinese Patent Application No. 202110113770.7, entitled "RESOURCE CLASSIFICATION MODEL TRAINING METHOD AND MULTIMEDIA RESOURCE RECOMMENDATION METHOD" and filed on Jan. 27, 2021. The entire disclosures of the prior applications are hereby incorporated by reference.

FIELD OF THE TECHNOLOGY

This application relates to the field of computer technologies, including a multimedia resource classification model training method and apparatus, a multimedia resource recommendation method and apparatus, a computer device, and a storage medium.

BACKGROUND OF THE DISCLOSURE

With rapid development of computer technologies, rich and colorful network applications emerge. People can publish multimedia resources on the network applications, and can also browse the multimedia resources on the network applications.

Traditionally, multimedia resources are randomly recommended to users. Such recommendations may involve low-quality multimedia resources. As a result, the multimedia resources recommended to users are often not relevant to their interest and desires. Moreover, the low-quality multimedia resources may occupy storage resources and may cause repeated searches and repeated interface refreshes, which in turn leads to low effectiveness of multimedia resource recommendations.

SUMMARY

Embodiments of this disclosure provide a multimedia resource classification model training method, apparatus, computer device, and storage medium and a multimedia resource recommendation method, apparatus, computer device, and storage medium are provided.

In an embodiment, a multimedia resource classification model training method includes acquiring an attribute information set and a training label set of training multimedia resources. The attribute information set includes attribute information corresponding to a plurality of dimensions. The training label set includes training labels corresponding to a plurality of tasks. The method further includes inputting the attribute information set of the training multimedia resources into a multimedia resource classification model that includes a plurality of feature sub-networks corresponding to the attribute information and a plurality of task sub-networks corresponding to the plurality of tasks. The multimedia resource classification model is configured to classify quality of multimedia resources. The method further includes vectorizing, using the plurality of feature sub-networks, the attribute information to obtain attribute feature vectors outputted by the plurality of feature sub-networks and inputting the obtained attribute feature vectors into the plurality of task sub-networks to obtain prediction labels corresponding to the plurality tasks. The method also includes obtaining a trained multimedia resource classification model by adjusting model parameters of one of the task sub-networks based on a training label from the training label set and based on a prediction label that correspond to a same task associated with the one of the task sub-networks, and by adjusting model parameters of one of the feature sub-networks based on the training label and the prediction label that correspond to the task until a convergence condition is satisfied.

In an embodiment, a multimedia resource recommendation method includes acquiring an attribute information set of multimedia resources. The target attribute information set includes target attribute information corresponding to a plurality of dimensions. The method further includes inputting the attribute information set into a trained multimedia resource classification model. The multimedia resource classification model includes a plurality of feature sub-networks and a plurality of task sub-networks. The method further includes vectorizing, using the plurality of feature sub-networks, the attribute to obtain attribute feature vectors outputted by the feature sub-networks and inputting the attribute feature vectors into the task sub-networks to obtain prediction labels outputted by the task sub-networks. The method also includes obtaining quality classification results corresponding to the multimedia resources based on the prediction labels and selectively recommending the multimedia resources based on the quality classification results.

In an embodiment, a multimedia resource classification model training apparatus includes processing circuitry configured to acquire an attribute information set and a training label set of training multimedia resources. The attribute information set includes attribute information corresponding to a plurality of dimensions. The training label set includes training labels corresponding to a plurality of tasks. The processing circuitry is further configured to input the attribute information set of the training multimedia resources into a multimedia resource classification model that includes a plurality of feature sub-networks corresponding to the attribute information and a plurality of task sub-networks corresponding to the plurality of tasks. The multimedia resource classification model is configured to classify quality of multimedia resources. The processing circuitry is further configured to vectorize, using the plurality of feature sub-networks, the attribute information to obtain attribute feature vectors outputted by the plurality of feature sub-networks and input the obtained attribute feature vectors into the plurality of task sub-networks to obtain prediction labels corresponding to the plurality tasks. The processing circuitry is further configured to obtain a trained multimedia resource classification model by adjusting model parameters of one of the task sub-networks based on a training label from the training label set and based on a prediction label that correspond to a same task associated with the one of the task sub-networks, and by adjusting model parameters of one of the feature sub-networks based on the training label and the prediction label that correspond to the task until a convergence condition is satisfied.

Details of one or more embodiments of this disclosure are provided in the subsequent accompanying drawings and descriptions. Other features, objectives, and advantages of this disclosure become apparent from the specification, the accompanying drawings, and the claims.

BRIEF DESCRIPTION OF THE DRAWINGS

To describe the technical solutions in embodiments of this disclosure, the following briefly describes the accompanying drawings required for describing the embodiments. The accompanying drawings in the following description show merely some embodiments of this disclosure, and a person of ordinary skill in the art may derive other drawings from these accompanying drawings.

DESCRIPTION OF EMBODIMENTS

To describe the objectives, technical solutions, and advantages of this disclosure, exemplary embodiments are described in detail below with reference to the accompanying drawings. It is to be understood that the specific embodiments described herein are only used for explaining rather than limiting this disclosure.

Artificial Intelligence (AI) technology is a comprehensive discipline and relates to a wide range of fields including both hardware-level technologies and software-level technologies. Basic AI technologies generally include technologies such as, but not limited to, a sensor, a dedicated AI chip, cloud computing, distributed storage, a big data processing technology, an operating/interaction system, and electromechanical integration. AI software technologies mainly include several major disciplines, such as, but not limited to, a computer vision (CV) technology, a speech processing technology, a natural language processing (NLP) technology, and machine learning (ML)/deep learning (DL) technology.

The solutions provided in the embodiments of this disclosure involve technologies such as CV, NLP, and ML of AI, and are specifically described by using the following embodiments.

Figure 1:
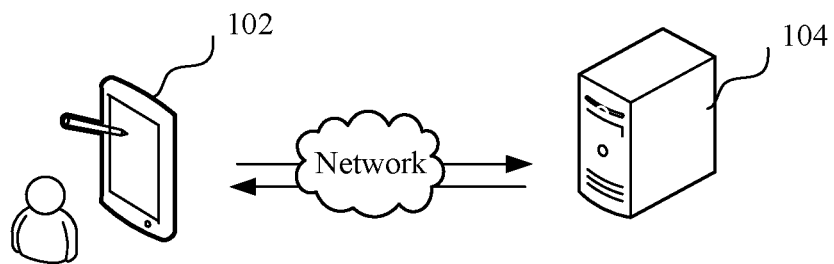
FIG. 1 is a diagram of an implementation environment of a multimedia resource classification model training method and a multimedia resource recommendation method according to an embodiment of this disclosure.

A multimedia resource classification model training method and a multimedia resource recommendation method according to this disclosure are applicable to an implementation environment shown in FIG. 1. A terminal 102 communicates with a server 104 through a network. The terminal 102 may be, but is not limited to, a personal computer, a notebook computer, a smart phone, a tablet computer, an Internet of Things (IoT) device, and a portable wearable device. The IoT device may be a smart speaker, a smart television, a smart air conditioner, a smart in-vehicle device, or the like. The portable wearable device may be a smart watch, a smart bracelet, a head-mounted device, or the like. The server 104 may be implemented by an independent server, a server cluster that includes a plurality of servers, or a cloud server.

The terminal 102 and the server 104 may be configured separately to perform the multimedia resource classification model training method and the multimedia resource recommendation method according to embodiments of this disclosure.

For example, the server 104 may acquire a target attribute information set and a training label set of training multimedia resources. The target attribute information set may include target attribute information corresponding to a plurality of dimensions. The training label set may include training labels corresponding to a plurality of tasks. The server 104 may input the target attribute information set of the training multimedia resources into a to-be-trained multimedia resource classification model. The multimedia resource classification model may include a plurality of feature sub-networks and task sub-networks corresponding to the tasks. The server 104 may vectorize, using the feature sub-networks in the multimedia resource classification model, target attribute information associated with the feature sub-networks to obtain attribute feature vectors outputted by the feature sub-networks. The server 104 may input the obtained attribute feature vectors into the task sub-networks to obtain prediction labels corresponding to the tasks. The server 104 may adjust parameters of the corresponding task sub-network based on the training label and the prediction label that correspond to the same task. Furthermore, the server 104 may adjust model parameters of the feature sub-networks based on the training labels and the prediction labels that correspond to the tasks until a convergence condition is satisfied, so as to obtain a trained multimedia resource classification model. The multimedia resource classification model may be configured to classify quality of to-be-recommended multimedia resources.

The terminal 102 may acquire a target attribute information set of to-be-recommended multimedia resources. The target attribute information set may include target attribute information corresponding to a plurality of dimensions. and the terminal 102 may input the target attribute information set into a trained multimedia resource classification model. The multimedia resource classification model may include a plurality of feature sub-networks and a plurality of task sub-networks. The terminal 102 may vectorize, using the feature sub-networks in the multimedia resource classification model, target attribute information associated with the feature sub-networks to obtain attribute feature vectors outputted by the feature sub-networks. The terminal 102 may input the obtained attribute feature vectors into the task sub-networks to obtain prediction labels outputted by the task sub-networks and may obtain quality classification results corresponding to the to-be-recommended multimedia resources based on the prediction labels. The terminal 102 may recommend the to-be-recommended multimedia resources based on the quality classification results.

The terminal 102 and the server 104 may also be configured to cooperatively perform the multimedia resource classification model training method and the multimedia resource recommendation method according to the embodiments of the present disclosure.

For example, the server 104 may acquire a target attribute information set and a training label set of training multimedia resources from the terminal 102. The server 104 may perform training of a multimedia resource classification model based on the target attribute information set and the training label set of the training multimedia resources to obtain a trained multimedia resource classification model.

The terminal 102 may acquire the trained multimedia resource classification model from the server 104. The terminal 102 may classify quality of multimedia resources using the trained multimedia resource classification model to obtain quality classification results, The terminal 102 may recommend multimedia resources based on the obtained quality classification results.

In the above multimedia resource classification model training method, supervised training may be performed on the multimedia resource classification model based on the target attribute information set and the training label set of the training multimedia resources. As a result, a multimedia resource classification model may accurately classify the quality of the to-be-recommended multimedia resources. The target attribute information set of the multimedia resources may include target attribute information corresponding to a plurality of dimensions. The target attribute information of different dimensions may reflect content quality of the multimedia resources from different perspectives. The target attribute information set may be inputted into the multimedia resource classification model, and quality of the multimedia resources may be accurately classified using comprehensive consideration of the target attribute information of the various dimensions. As a result, prediction labels may be obtained that can accurately reflect the quality of the multimedia resources. In addition, the multimedia resource classification model may include a plurality of task sub-networks, which may include a multi-task model and may predict performance of the multimedia resources on the tasks. During model training, a plurality of related tasks may be simultaneously learned in parallel. Gradients may be simultaneously back propagated to learn connections and differences between different tasks, so as to improve learning efficiency and quality of each task. In addition, the trained multimedia resource classification model may be configured to classify the quality of the multimedia resources, so as to recommend high-quality multimedia resources to users, which may improve effectiveness of multimedia resource recommendations. Effective multimedia resource recommendation may prevent the users' repeated search or repeated interface refreshes caused by low-quality and ineffective multimedia resource recommendations. The repeated search or repeated interface refreshes may occupy a large number of resources of a computer device. Therefore, a waste of resources of the computer device may be reduced or avoided based on the improvement of the effectiveness of resource recommendations.

In the above multimedia resource recommendation method, the target attribute information set of the multimedia resources may include target attribute information corresponding to a plurality of dimensions. The target attribute information of different dimensions may reflect content quality of the multimedia resources from different perspectives. The target attribute information set may be inputted into the multimedia resource classification model. Quality of the multimedia resources may be accurately classified using comprehensive consideration of the target attribute information of the plurality of dimensions. As a result, accurate quality classification results may be obtained. In addition, the multimedia resource classification model may include a plurality of task sub-networks, and which may include a multi-task model and may predict performance of the multimedia resources on the tasks. The quality classification results of the multimedia resources may be obtained by integrating the performance of the multimedia resources on the tasks, which may further improve accuracy of classification of the multimedia resources. In addition, multimedia resources with better quality may be identified using the multimedia resource classification model, so as to recommend the multimedia resources with better quality to the users, which may improve the effectiveness of the multimedia resource recommendations. Effective multimedia resource recommendations may prevent the users' repeated searches or repeated interface refreshes caused by low-quality and ineffective multimedia resource recommendations. The repeated searches or repeated interface refreshes may occupy a large number of resources of a computer device. Therefore, a waste of resources of the computer device may be reduced or eliminated based on the improvement of the effectiveness of resource recommendations.

Figure 2:
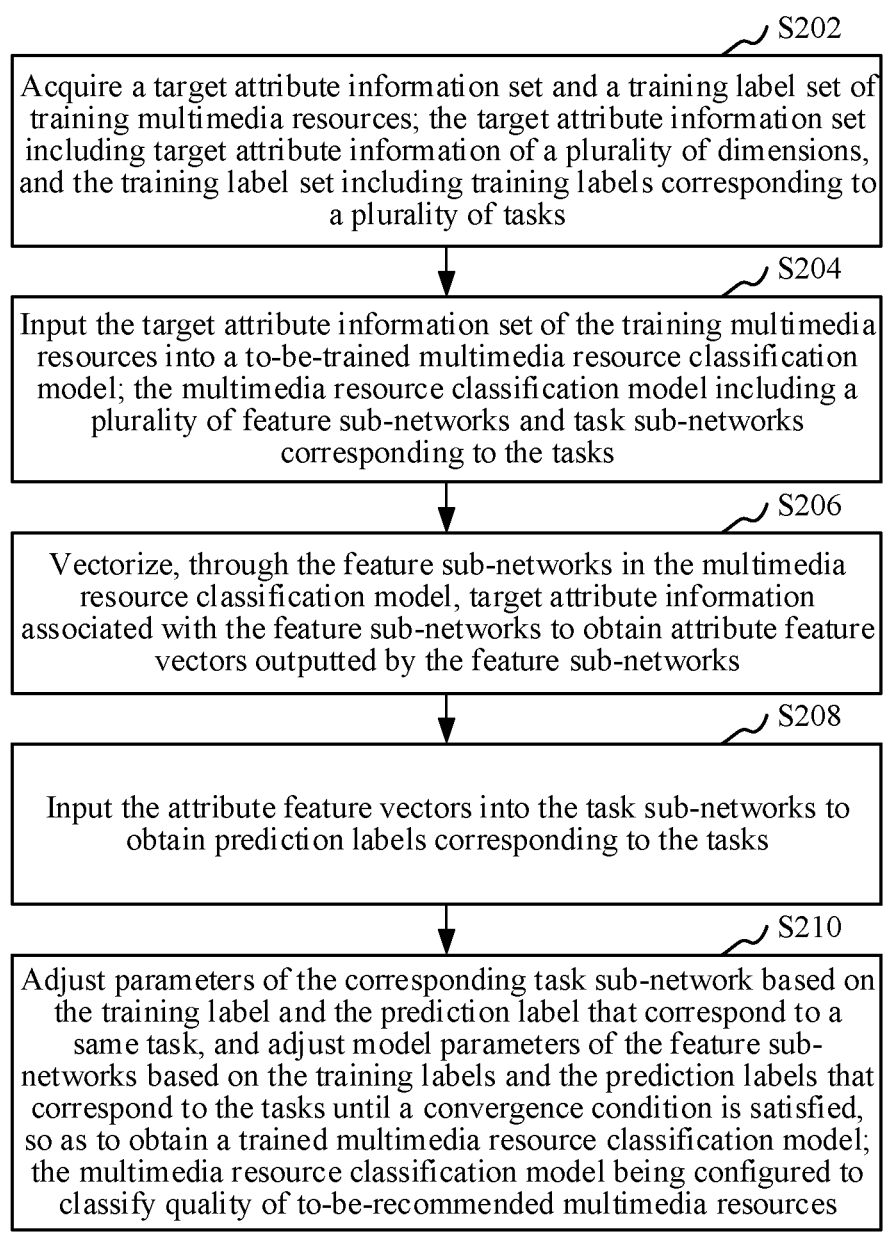
FIG. 2 is a schematic flowchart of a multimedia resource classification model training method according to an embodiment of this disclosure.

In an embodiment, as shown in FIG. 2, a multimedia resource classification model training method is provided. Description is based on an example in which the method is applied to a computer device in FIG. 1. The computer device may be the terminal 102 or the server 104 in FIG. 1. Referring to FIG. 2, the multimedia resource classification model training method may include the following steps:

In step S202: a target attribute information set and a training label set of training multimedia resources are acquired; the target attribute information set may include target attribute information corresponding to a plurality of dimensions, and the training label set may include training labels corresponding to a plurality of tasks.

The term "multimedia resources", as used herein, refers to resources including at least two media, such as, but not limited to, articles including pictures, pictures including text, video including subtitles, and video including audio. A user may publish multimedia resources on a variety of resource service platforms. For example, life short video may be published on social applications, and news information may be published on information applications. The term "training multimedia resources", as used herein, refers to multimedia resources used for training of a model. The target attribute information is information used for describing attributes, characteristics, and functions of the multimedia resources. The target attribute information may specifically be text related information, image related information, style related information, user related information of a multimedia resource publishing user, or the like in the multimedia resources.

The term "training labels", as used herein, refer to quality labels of the training multimedia resources. The quality labels may be used for measuring quality of the multimedia resources. For example, the quality labels may include a positive label and a negative label. The positive label may indicate that a multimedia resource performs better on a corresponding task and is high-quality multimedia resource on the task. The negative label may indicate that the multimedia resource performs moderately or poorly on the corresponding task and is not a high-quality multimedia resource on the task. The quality labels may also include a first label, a second label, a third label, and the like. Different labels may represent different quality levels. The quality levels may reflect degrees of quality of the multimedia resources. For example, the better the performance of a multimedia resource on a corresponding task, the higher the corresponding quality level on the task. A task corresponds to an interactive behavior between multimedia resources and users, such as, but not limited to, a task related to clicking behaviors, a task related to browsing behaviors, and a task related to commenting behaviors. The training label set may include a quality label corresponding to a click-through rate (CTR) task, a quality label corresponding to a browsing time length task, and a quality label corresponding to a comment rate task.

The term "the target attribute information corresponding to the plurality of dimensions," as used herein, refers to target attribute information of at least two dimensions, and the term "training labels corresponding to the plurality of tasks," as used herein, refers to training labels respectively corresponding to at least two tasks.

In an aspect, the computer device may acquire the training multimedia resources from a multimedia resource database, and may determine the training label set corresponding to the training multimedia resources. Further, the computer device may analyze content of the training multimedia resources to obtain the target attribute information set of the training multimedia resources. For example, a text title, a text body, image quality, and content layout of the multimedia resources may respectively be taken as the target attribute information to form the target attribute information set.

In an embodiment, the training multimedia resources may be published and recommended multimedia resources. Then, a reasonable evaluation system of multimedia resource quality may be constructed from the perspective of user feedback, and the training label set of the training multimedia resources may be determined based on the evaluation system. For example, the training labels of the training multimedia resources may be determined based on a large number of users' feedback information and evaluation information on the multimedia resources. For example, the quality label set of the multimedia resources may be determined based on CTRs, browsing time lengths, and comment rates of the multimedia resources. Further, the reasonable evaluation system of multimedia resource quality may also be constructed by combining content and user feedback. The training multimedia resources may also be multimedia resources that have not been published or recommended. The reasonable evaluation system of multimedia resource quality may be constructed from the perspective of content, and the training label set of the training multimedia resources may be determined based on the evaluation system. For example, the training labels of the training multimedia resources may be quality labels artificially determined according to expert knowledge. The training labels of the training multimedia resources may also be determined according to quality labels of published multimedia resources with similar content. For example, if it is known on a CTR task that a quality label of a multimedia resource 1 is a positive label and a similarity between content of the multimedia resource 1 and a multimedia resource 2 is greater than a preset threshold, indicating that the content of the multimedia resource 1 and the multimedia resource 2 is similar, a quality label of the multimedia resource 2 on the CTR task may also be determined to be a positive label.

In step S204: the target attribute information set of the training multimedia resources is inputted into a to-be-trained multimedia resource classification model; the multimedia resource classification model may include a plurality of feature sub-networks and task sub-networks corresponding to the tasks.

The multimedia resource classification model nay be a machine learning model and may be configured to classify quality of the multimedia resources, that is, configured to identify high-quality multimedia resources. The multimedia resource classification model may include a plurality of feature sub-networks and a plurality of task sub-networks. The feature sub-networks may be configured to transform the target attribute information into attribute feature vectors. Different feature sub-networks may be configured to process different target attribute information. The task sub-networks may be configured to predict performance of the multimedia resources on specific tasks based on the attribute feature vectors. Different task sub-networks may correspond to different tasks.

In step S206: target attribute information associated with the feature sub-networks is vectorized, using the feature sub-networks in the multimedia resource classification model, to obtain attribute feature vectors outputted by the feature sub-networks.

In an aspect, the computer device may input the target attribute information set of the training multimedia resources into the to-be-trained multimedia resource classification model. The feature sub-networks in the multimedia resource classification model may receive the corresponding target attribute information. The feature sub-networks may vectorize the target attribute information associated therewith respectively, so as to output the corresponding attribute feature vectors. The term "vectorizing", as used herein, refers to representing the target attribute information by dense vectors. The dense vectors may enable the model to fully learn relevant information. The feature sub-networks may vectorize the target attribute information in a same manner or in different manners.

In an embodiment, the computer device may first transform the target attribute information into original feature vectors, then may input the original feature vectors into the feature sub-networks, and may densify the original feature vectors using the feature sub-networks to obtain the attribute feature vectors. The target attribute information may specifically be transformed into the original feature vectors by one hot encoding.

In an embodiment, the multimedia resource classification model may include at least two of a text feature sub-network, an atomic feature sub-network, an image-text fusion feature sub-network, and a style feature sub-network. The text feature sub-network may be configured to process text related target attribute information corresponding to the multimedia resources. The atomic feature sub-network may be configured to process atomic features corresponding to the multimedia resources. The term "atomic features," as used herein, refers to minimum and indivisible features. The image-text fusion feature sub-network may be configured to process text related target attribute information and image related target attribute information that correspond to the multimedia resources, and may fuse such target attribute information. The style feature sub-network may be configured to process content-style related target attribute information corresponding to the multimedia resources. The feature sub-networks may be configured to process target attribute information corresponding to different dimensions. The attribute feature vectors finally obtained may represent content information of the multimedia resources that is highly refined and from different perspectives.

In step S208: the attribute feature vectors are inputted into the task sub-networks to obtain prediction labels corresponding to the tasks.

In an aspect, after obtaining the attribute feature vectors respectively outputted by the feature sub-networks, the computer device may input the attribute feature vectors into the task sub-networks, and the corresponding prediction labels may be obtained after the task sub-networks perform data processing on input data. For example, the multimedia resource classification model may include three feature sub-networks and two task sub-networks. A feature sub-network 1 may output an attribute feature vector 1, a feature sub-network 2 may output an attribute feature vector 2, and a feature sub-network 3 may output an attribute feature vector 3. The attribute feature vectors 1 to 3 may be inputted into a task sub-network 1 to obtain a prediction label 1, and the attribute feature vectors 1 to 3 may be inputted into a task sub-network 2 to obtain a prediction label 2. In order to improve learning efficiency, the computer device may also input the attribute feature vectors into the corresponding task sub-networks, and corresponding task prediction results may be obtained after the task sub-networks perform data processing on input data. For example, the attribute feature vector 1 and the attribute feature vector 2 may be inputted into the task sub-network 1 to obtain the prediction label 1, and the attribute feature vector 2 and the attribute feature vector 3 may be inputted into the task sub-network 2 to obtain the prediction label 2.

In an embodiment, the task sub-networks may be configured to predict users' feedback information on different categories of the multimedia resources. For example, a task sub-network may be configured to predict CTRs of the multimedia resources, a task sub-network may be configured to predict browsing time lengths of the multimedia resources, a task sub-network may be configured to predict comment rates of the multimedia resources, a task sub-network may be configured to predict forwarding rates of the multimedia resources, and so on.

In step S210: parameters of the corresponding task sub-network are adjusted based on the training label and the prediction label that correspond to a same task, and model parameters of the feature sub-networks are adjusted based on the training labels and the prediction labels that correspond to the tasks until a convergence condition is satisfied. As a result, a trained multimedia resource classification model is obtained that is configured to classify quality of multimedia resources.

In an aspect, the computer device may calculate training loss values respectively corresponding to the tasks based on the training label and the prediction label that correspond to a same task and may simultaneously perform back propagation based on the training loss values. In addition, the computer device may adjust model parameters of the multimedia resource classification model until the convergence condition is satisfied to obtain the trained multimedia resource classification model. When adjusting the model parameters, the computer device may adjust parameters of the corresponding task sub-network based on the training label and the prediction label that correspond to the same task, and may adjust the model parameters of the feature sub-networks based on the training labels and the prediction labels that correspond to the tasks. For example, the multimedia resource classification model may include a task sub-network corresponding to a CTR task and a task sub-network corresponding to a browsing time length task. Model parameters of the task sub-network corresponding to the CTR task may be adjusted based on a training label and a prediction label that correspond to the CTR task, model parameters of the task sub-network corresponding to the browsing time length task may be adjusted based on a training label and a prediction label that correspond to the browsing time length task, and model parameters of the feature sub-networks may be adjusted based on the training label and the prediction label that correspond to the CTR task and the training label and the prediction label that correspond to the browsing time length task. The convergence condition may be at least one of the plurality of model iterations reaching an iteration threshold and the training loss values corresponding to the task sub-networks may be less than a preset threshold.

In an embodiment, the multimedia resource classification model may be a multi-task model. The multi-task model may be a machine learning model based on multi-task learning. Multi-task learning may be a machine learning method that combines a plurality of related tasks together for learning based on shared representation. Multi-task learning may also be a derived transfer learning method, in which main tasks use domain-related information owned by training signals of related tasks as continuous derivation bias to improve generalization performance of the main tasks. Multi-task learning may involve simultaneous parallel learning of a plurality of related tasks, and gradients may be simultaneously back propagated. A plurality of tasks may help each other to learn using underlying shared representation to improve the generalization performance. Multi-task learning is an inductive transfer mechanism in essence, which may use additional information sources to improve learning performance of a current task, including improving generalization accuracy, learning rates, and comprehensibility of learned models. The multi-task model may be a hard-parameter sharing model, a mixture-of-experts (MOE) model, a multi-gate mixture-of-experts (MMOE) model, or the like. A main task of the multimedia resource classification model may be to classify the quality of the multimedia resources, that is, to obtain quality classification results of the multimedia resources. Related tasks of the main task of the multimedia resource classification model may be tasks corresponding to the task sub-networks, such as, but not limited to, a task for predicting CTRs of the multimedia resources, a task for predicting browsing time lengths of the multimedia resources, and the like.

The trained multimedia resource classification model may be configured to classify the quality of the multimedia resources and may identify high-quality multimedia resources. During multimedia resource recommendation, obvious low-quality multimedia resources may be first filtered out, and then high-quality multimedia resources may be identified using the multimedia resource classification model. The identified high-quality multimedia resources may be recommended to the users first, thereby improving effectiveness of the multimedia resource recommendation. When the high-quality multimedia resources are identified using the multimedia resource classification model, the target attribute information set of the multimedia resources may be inputted into the multimedia resource classification model. The task sub-networks in the multimedia resource classification model may output corresponding prediction labels. The multimedia resource classification model may output final quality classification results based on the prediction labels. For example, if all the prediction labels are positive labels, the outputted quality classification results may be positive labels. Alternatively, if most of the prediction labels are positive labels, the outputted quality classification results may be positive labels. For example, when more than half of the prediction labels are positive labels, the outputted quality classification results may be positive labels.

In the above multimedia resource classification model training method, supervised training may be performed on the multimedia resource classification model based on the target attribute information set and the training label set of the training multimedia resources, so as to obtain a multimedia resource classification model that can accurately classify the quality of the multimedia resources. The target attribute information set of the multimedia resources may include target attribute information corresponding to a plurality of dimensions. The target attribute information corresponding to different dimensions may reflect content quality of the multimedia resources from different perspectives. The target attribute information set may be inputted into the multimedia resource classification model, and quality of the multimedia resources may be accurately classified through comprehensive consideration of the target attribute information of the dimensions, so as to obtain prediction labels that can accurately reflect the quality of the multimedia resources. In addition, the multimedia resource classification model may include a plurality of task sub-networks. The multimedia resource classification model may be a multi-task model and may predict performance of the multimedia resources on the tasks. During model training, a plurality of related tasks may be simultaneously learned in parallel, and gradients may be simultaneously back propagated to learn connections and differences between different tasks, so as to improve learning efficiency and quality of each task. Furthermore, the trained multimedia resource classification model may be configured to classify the quality of the multimedia resources, so as to recommend high-quality multimedia resources to users, which may improve effectiveness of multimedia resource recommendations. Effective multimedia resource recommendation may prevent the users' repeated searches or repeated interface refreshes caused by low-quality and ineffective multimedia resource recommendations. The repeated search or repeated interface refresh may occupy a large number of resources of a computer device. Therefore, a waste of resources of the computer device may also be reduced or eliminated based on the improvement of the effectiveness of resource recommendation.

Figure 3:
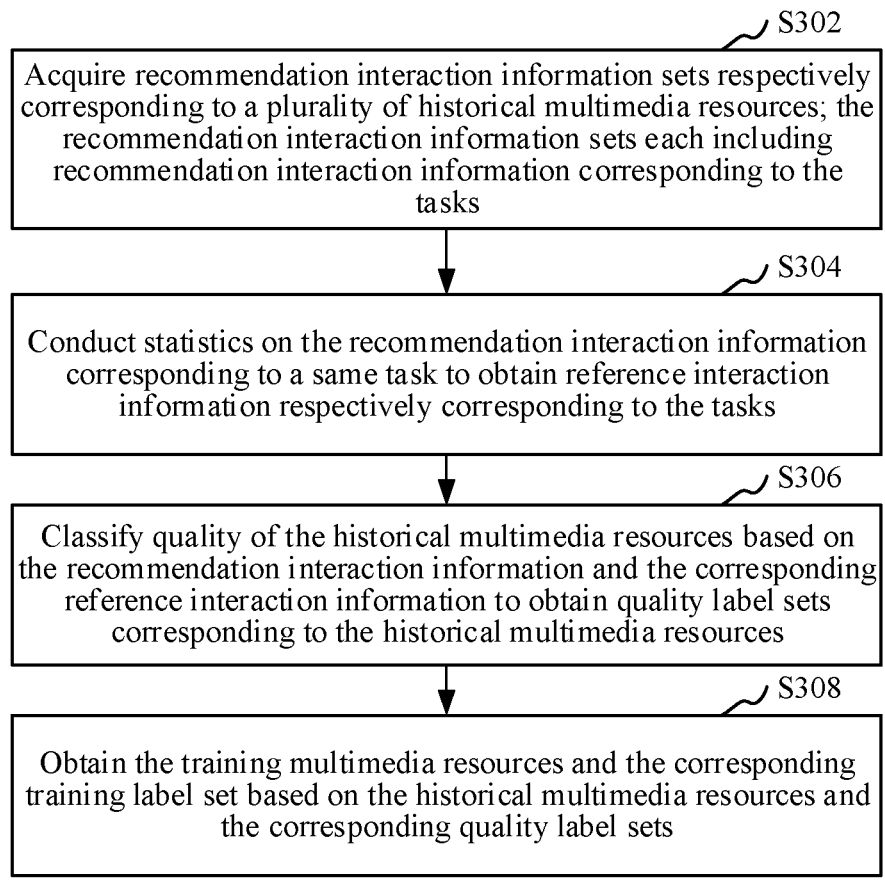
FIG. 3 is a schematic flowchart of acquiring training labels of training multimedia resources method according to an embodiment of this disclosure.

In an embodiment, as shown in FIG. 3, the method of acquiring a training label set of training multimedia resources may include the following steps:

In step S302: recommendation interaction information sets respectively corresponding to a plurality of historical multimedia resources is acquired. Each of the recommendation interaction information sets may include recommendation interaction information corresponding to the tasks.

The term "historical multimedia resources," as used herein, refers to published and recommended multimedia resources. The term "recommendation interaction information," as used herein, refers to information generated using interactive behaviors between ordinary users and a multimedia resource publishing user after the multimedia resources are published, that is, feedback information of the ordinary users on the multimedia resources. The interactive behaviors may include, but are not limited to, the ordinary users' operations (such as browse, thumbs up, comment, and forward) on the multimedia resources published by the publishing user. The recommendation interaction information may include, but is not limited to, information such as CTRs, browsing time lengths, comment rates, thumbs-up rates, thumbs-down rates, and forwarding rates of the multimedia resources. It should be noted that the foregoing recommendation interaction information in pairs may be regarded as recommendation interaction information corresponding to different tasks.

In an aspect, the computer device may acquire a plurality of historical multimedia resources and may acquire recommendation interaction information sets respectively corresponding to the plurality of historical multimedia resources in a same time period. The recommendation interaction information sets may each include recommendation interaction information corresponding to a plurality of tasks.

In step S304: statistics on the recommendation interaction information corresponding to a same task are calculated to obtain reference interaction information respectively corresponding to the tasks.

The term "reference interaction information," as used herein, refers to statistical results of a plurality of pieces (elements) of recommendation interaction information corresponding to a same task. The reference interaction information may reflect an average level of the plurality of pieces of recommendation interaction information corresponding to the same task. For example, the reference interaction information may be an average value of the recommendation interaction information corresponding to the same task, a median value of the recommendation interaction information corresponding to the same task, or the like.

In an aspect, the computer device may acquire the recommendation interaction information corresponding to the same task from the recommendation interaction information sets, and may calculate statistics on the recommendation interaction information corresponding to the same task to obtain the reference interaction information respectively corresponding to the tasks. For example, the computer device may acquire CTRs of the historical multimedia resources, may calculate an average CTR as reference interaction information corresponding to the CTR task, may acquire browsing time lengths of the multimedia resources, and may calculate an average browsing time length as reference interaction information corresponding to the browsing time length task.

In step S306: quality of the historical multimedia resources is classified based on the recommendation interaction information and the corresponding reference interaction information to obtain quality label sets corresponding to the historical multimedia resources.

In an aspect, in the recommendation interaction information set corresponding to a same historical multimedia resource, the computer device may classify quality of any historical multimedia resource under the tasks based on a result of the comparison between the recommendation interaction information and the reference interaction information that correspond to a same task. As a result, a quality label set corresponding to a current historical multimedia resource may be obtained. For example, the recommendation interaction information set may include a CTR and a browsing time length. If a CTR of a historical multimedia resource 1 is greater than the average CTR, a quality label corresponding to the historical multimedia resource 1 on the CTR task may be determined to be a positive label. If a browsing time length of the historical multimedia resource 1 is greater than the average browsing time length, a quality label corresponding to the historical multimedia resource 1 on the browsing time length task may be determined to be a positive label. A quality label set of the historical multimedia resource 1 may include the positive label corresponding to the CTR task and the positive label corresponding to the browsing time length task.

In step S308: the training multimedia resources and the corresponding training label set are obtained based on the historical multimedia resources and the corresponding quality label sets.

In an aspect, the computer device may determine quality label sets respectively corresponding to a large number of historical multimedia resources based on recommendation interaction information sets respectively corresponding to the large number of historical multimedia resources. The computer device may select one part of historical multimedia resources from the large number of historical multimedia resources as the training multimedia resources, and may train the multimedia resource classification model by using the training multimedia resources and the corresponding training label set. Further, the computer device may also select the other portion of the historical multimedia resources as verification multimedia resources, and may verify classification accuracy of the trained multimedia resource classification model by using the verification multimedia resources. If the classification accuracy is low, the computer device may update the multimedia resource classification model based on relevant information of latest multimedia resources (that is, multimedia resources whose release time is closest to current time).

In this embodiment, statistical analysis may be performed on recommendation interaction information sets of a large number of historical multimedia resources, and quality label sets of the historical multimedia resources may be determined based on the results of the statistical analysis. As a result, training data of the multimedia resource classification model may be obtained. The quality of the multimedia resources may be classified based on the users' feedback information on the multimedia resources, and multimedia resources that the users are interested in and more concerned about may be determined to be high-quality multimedia resources. Accordingly, the trained multimedia resource classification model may predict multimedia resources that the users may be interested in and more concerned about and may recommend the multimedia resources to the users, which may improve effectiveness of resource recommendations.

Figure 4:
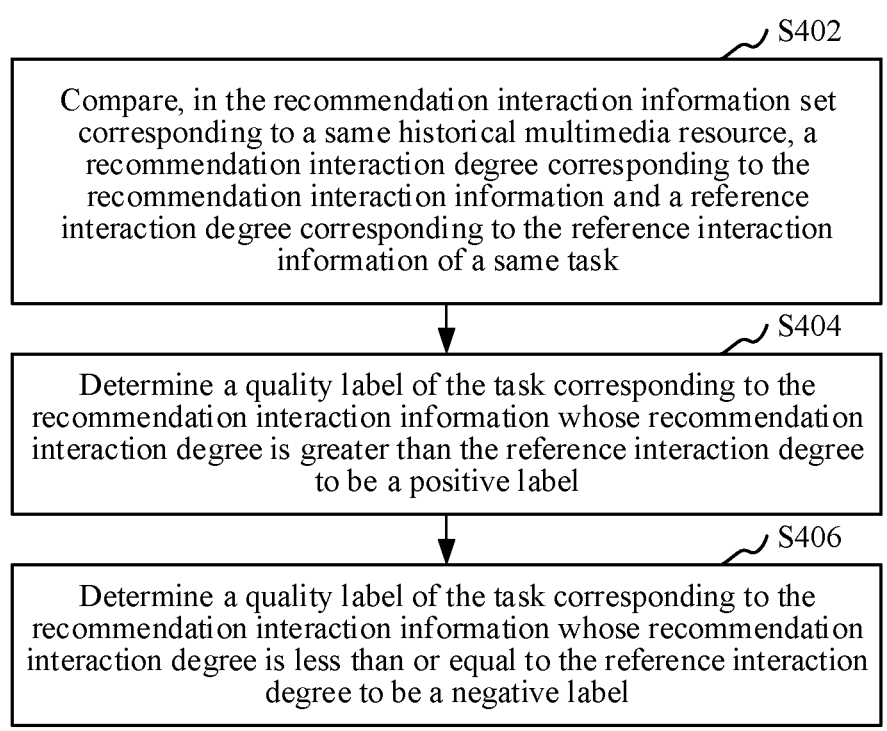
FIG. 4 is a schematic flowchart of determining quality labels of historical multimedia resources based on recommendation interaction information and corresponding reference interaction information according to an embodiment of this disclosure.

In one embodiment, as shown in FIG. 4, the method of classifying quality of the historical multimedia resources based on the recommendation interaction information and the corresponding reference interaction information may include the following steps:

In step S402: in the recommendation interaction information set corresponding to a same historical multimedia resource, a recommendation interaction degree corresponding to the recommendation interaction information is compared to a reference interaction degree corresponding to the reference interaction information of a same task.

The term "interaction degree," as used herein refers to normalized data that transforms relevant interaction information into positive dimensions for data comparison. The interaction degree may specifically be expressed by an interaction score. The higher the interaction score, the more frequent the positive interaction between the users and the multimedia resources, and the better the quality of the multimedia resources. The recommendation interaction degree may be an interaction degree obtained by transforming the recommendation interaction information, which may be obtained by normalizing the recommendation interaction information. The reference interaction degree may be an interaction degree obtained by transforming the reference interaction information, which may be obtained by normalizing the reference interaction information.

In an aspect, the recommendation interaction information corresponding to the tasks may be transformed into recommendation interaction degrees using a formula, and the reference interaction information corresponding to the tasks may be transformed into reference interaction degrees using a formula. For example, if the recommendation interaction information is a CTR (the higher a CTR of a multimedia resource, the better the quality of the multimedia resource, and the more interested the users are in the multimedia resource), the CTR may be directly transformed into a centesimal click score. The higher a click score of a multimedia resource, the better the quality of the multimedia resource, and the more interested the users are in the multimedia resource. Similarly, an average CTR may be transformed into a centesimal average click score. If the recommendation interaction information is a thumbs-down rate (the higher a thumbs-down rate of a multimedia resource, the lower the quality of the multimedia resource, and the less interested the users are in the multimedia resource), the thumbs-down rate may be first transformed into a centesimal initial score, and a difference between 100 and the initial score may be taken as a thumbs-down score. The higher a thumbs-down score of a multimedia resource, the better the quality of the multimedia resource, and the more interested the users are in the multimedia resource. In the recommendation interaction information set corresponding to a same historical multimedia resource, the computer device may directly compare a recommendation interaction degree corresponding to the recommendation interaction information and a reference interaction degree corresponding to the reference interaction information of a same task to obtain the quality labels corresponding to the respective tasks.

Step S404: Determine a quality label of the task corresponding to the recommendation interaction information whose recommendation interaction degree is greater than the reference interaction degree to be a positive label.

In step S406: a quality label of the task corresponding to the recommendation interaction information whose recommendation interaction degree is less than or equal to the reference interaction degree is determined to be a negative label.

In an aspect, the computer device may determine the quality label of the task corresponding to the recommendation interaction information whose recommendation interaction degree is greater than the reference interaction degree to be a positive label, and may determine the quality label of the task corresponding to the recommendation interaction information whose recommendation interaction degree is less than or equal to the reference interaction degree to be a negative label. For example, the recommendation interaction information set of the historical multimedia resources may include, but is not limited to, a CTR, a browsing time length, and a forwarding rate. If a click interaction degree of the historical multimedia resource 1 is greater than a reference click interaction degree, a quality label corresponding to the historical multimedia resource 1 on the CTR task may be determined to be a positive label. If a browsing time length interaction degree of the historical multimedia resource 1 is greater than a reference browsing time length interaction degree, a quality label corresponding to the historical multimedia resource 1 on the browsing time length task may be determined to be a positive label. If a forwarding rate interaction degree of the historical multimedia resource 1 is less than a reference forwarding rate interaction degree, a quality label corresponding to the historical multimedia resource 1 on a forwarding rate task may be determined to be a negative label. A quality label set of the historical multimedia resource 1 may include, but is not limited to, the positive label corresponding to the CTR task, the positive label corresponding to the browsing time length task, and the negative label corresponding to the forwarding rate task.

Corresponding statistical intervals of labels of the quality levels may also be set based on the reference interaction degrees. In an exemplary task, a label corresponding to a target statistical interval into which a recommendation interaction degree of a historical multimedia resource falls may be taken as a quality label corresponding to the historical multimedia resource under the task.

In this embodiment, the quality labels corresponding to the historical multimedia resource under the tasks may be quickly determined by comparing the recommendation interaction degree corresponding to the recommendation interaction information and the reference interaction degree corresponding to the reference interaction information of the same task.

In an embodiment, the feature sub-network may include a text feature sub-network, target attribute information associated with the text feature sub-network may include a plurality of pieces of text attribute information, and the text feature sub-network may include data processing channels respectively corresponding to the plurality of pieces of text attribute information. The vectorizing, using the feature sub-networks in the multimedia resource classification model, target attribute information associated with the feature sub-networks may include: vectorizing, using the data processing channels in the text feature sub-network, the corresponding text attribute information to obtain text feature vectors outputted by the data processing channels. An attribute feature vector outputted by the text feature sub-network may be obtained based on the text feature vectors.

The term "text attribute information," as used herein, refers to text related attribute information in the multimedia resources, such as, but not limited to, a text title, a text label, and a text body. The text label may be a text topic, category, keyword, or the like. The target attribute information associated with the text feature sub-network including a plurality of pieces of text attribute information means may include at least two pieces of text attribute information.

In an aspect, the multimedia resource classification model may include a text feature sub-network. The text feature sub-network may be configured to process text attribute information. After the target attribute information set is inputted into the multimedia resource classification model, the text attribute information in the target attribute information set may be inputted into the text feature sub-network. The text feature sub-network may include data processing channels respectively corresponding to the text attribute information. The text feature sub-network may vectorize, using the data processing channels, the corresponding text attribute information respectively to obtain text feature vectors. An attribute feature vector outputted by the text feature sub-network may be obtained based on the text feature vectors. In an aspect, the text feature vectors may be spliced to obtain the corresponding attribute feature vector.

Figure 5:
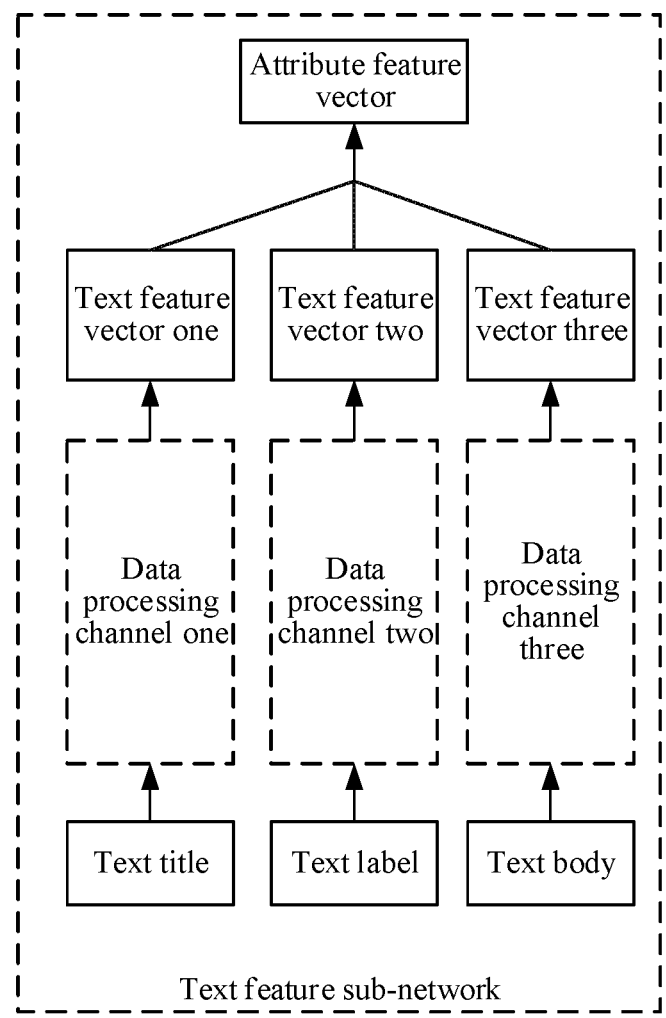
FIG. 5 is a schematic structural diagram of a text feature sub-network according to an embodiment of this disclosure.

Referring to FIG. 5, the target attribute information associated with the text feature sub-network may include a text title, a text label, and a text body. The text feature sub-network may vectorize the text title using data processing channel one to obtain text feature vector one, may vectorize the text label using data processing channel two to obtain text feature vector two, may vectorize the text body using data processing channel three to obtain text feature vector three, and may splice the text feature vector one, the text feature vector two, and the text feature vector three to obtain an attribute feature vector.

In this embodiment, different text attribute information may be processed using different data processing channels, which may improve specificity and accuracy of data processing, so that the attribute feature vectors obtained based on accurate text feature vectors may comprehensively and accurately represent text information of the multimedia resources.

In an embodiment, the feature sub-networks may include an atomic feature sub-network; and the vectorizing, using the feature sub-networks in the multimedia resource classification model, target attribute information associated with the feature sub-networks to obtain attribute feature vectors outputted by the feature sub-networks may include: performing, using the atomic feature sub-network, feature crossing on target attribute information associated with the atomic feature sub-network to obtain at least one cross feature vector; and obtaining an attribute feature vector outputted by the atomic feature sub-network based on the cross feature vectors.

In an aspect, the multimedia resource classification model may include an atomic feature sub-network. The atomic feature sub-network may be configured to process target attribute information of an atomic feature class. After the target attribute information set is inputted into the multimedia resource classification model, the target attribute information of the atomic feature class in the target attribute information set may be inputted into the atomic feature sub-network. The atomic feature sub-network may perform feature crossing on the target attribute information to obtain at least one cross feature vector. Specifically, feature crossing may be performed on the target attribute information in pairs to obtain the cross feature vectors. The cross feature vectors may reflect correlation between the target attribute information.

In an embodiment, the target attribute information associated with the atomic feature sub-network may include at least two of user attribute information, image attribute information, language attribute information, and text statistics attribute information.

In an aspect, the target attribute information associated with the atomic feature sub-network may include atomic features of the multimedia resources, and specifically may include at least two of user attribute information, image attribute information, language attribute information, and text statistics attribute information. The term "user attribute information," as used herein, refers to user attribute information of a publishing user of the multimedia resources, which may specifically be account-related information of the publishing user, such as, but not limited to, an account level, account verticality, and account authority. The term "image attribute information," as used herein refers to image-related information in the multimedia resources, such as, but not limited to, an image quantity, image clarity and beauty. The term "language attribute information," as used herein, refers to text language and wording related information in the multimedia resources, such as, but not limited to, figures of speech (such as numbers of parallel sentences and figurative sentences), quotations of ancient poems, overall lexical diversity, and syntactic diversity. The term "text statistics attribute information," as used herein, refers to information obtained by statistics on text content in the multimedia resources, such as, but not limited to, a text length and height, quality of a title, a degree of matching between the title and a body, and a text layout score. Some atomic features may be directly acquired, and some atomic features may be obtained by statistics using a corresponding software tool. Multimedia resources published by users with advanced accounts are generally more attractive and typically have higher quality. Multimedia resources with rich and exquisite illustration are generally more attractive and typically have higher quality. Euphuistical multimedia resources are generally more attractive and typically have higher quality. The atomic features may individually represent the quality of the multimedia resources, and may also cooperate to maximize representation of the quality of the multimedia resources.

Figure 6:
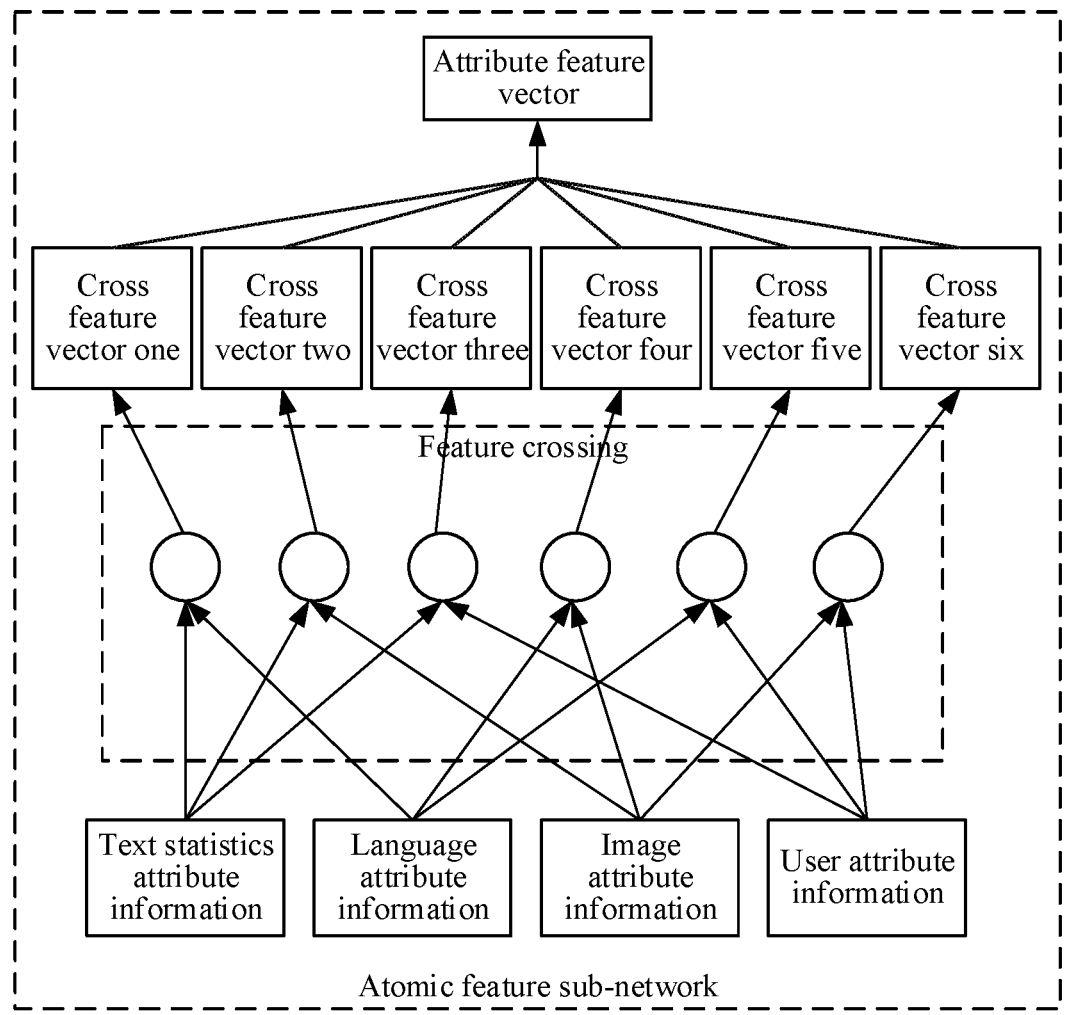
FIG. 6 is a schematic structural diagram of an atomic feature sub-network according to an embodiment of this disclosure.

Referring to FIG. 6, the target attribute information associated with the atomic feature sub-network may include user attribute information, image attribute information, language attribute information, and text statistics attribute information. The atomic feature sub-network may perform feature crossing on the target attribute information in pairs to obtain a plurality of cross feature vectors, and may splice the cross feature vectors to obtain an attribute feature vector.

In this embodiment, combined features between the target attribute information may be effectively learned by performing feature crossing on the target attribute information in pairs, so that the attribute feature vectors obtained based on the cross feature vector may comprehensively and accurately represent the atomic features of the multimedia resources.

In an embodiment, the feature sub-networks may include an image-text fusion feature sub-network, target attribute information associated with the image-text fusion feature sub-network may include text attribute information and image attribute information, and the image-text fusion feature sub-network may include a text data processing channel corresponding to the text attribute information and an image data processing channel corresponding to the image attribute information. The vectorizing, using the feature sub-networks in the multimedia resource classification model, target attribute information associated with the feature sub-networks may include: encoding the text attribute information using the text data processing channel to obtain an intermediate feature vector; encoding the image attribute information using the image data processing channel to obtain an image feature vector; performing attention allocation on the intermediate feature vector based on the image feature vector to obtain a first image-text fusion feature vector; performing attention allocation on the image feature vector based on the intermediate feature vector to obtain a second image-text fusion feature vector; and obtaining an attribute feature vector outputted by the image-text fusion feature sub-network based on the first image-text fusion feature vector and the second image-text fusion feature vector.

In an aspect, the multimedia resource classification model may include an image-text fusion feature sub-network. The image-text fusion feature sub-network may be configured to process text attribute information and image attribute information. The text attribute information may include at least one statement. The image attribute information may include at least one image. After the target attribute information set is inputted into the multimedia resource classification model, the text attribute information and the image attribute information in the target attribute information set may be inputted into the image-text fusion feature sub-network. The image-text fusion feature sub-network may include a text data processing channel corresponding to the text attribute information and an image data processing channel corresponding to the image attribute information. The text data processing channel may encode the text attribute information to obtain an intermediate feature vector. The image data processing channel may encode the image attribute information to obtain an image feature vector.

Further, the image may affect the text. Therefore, the computer device may perform attention allocation on the intermediate feature vector based on the image feature vector to obtain the first image-text fusion feature vector. The attention allocation may be performed on the intermediate feature vector to allocate different attention weights to the statements in the text attribute information. The attention weights of the statements may reflect importance of the statements in the multimedia resources. The greater the attention weight, the higher the importance. For example, a greater attention weight may be allocated to a statement more similar to the feature vector corresponding to the image. The first image-text fusion feature vector may be a feature vector obtained by weighting and summing the feature vectors corresponding to the statements based on the attention weights corresponding to the statements.

The text may also affect the image. The computer device may perform attention allocation on the image feature vector based on the intermediate feature vector to obtain the second image-text fusion feature vector. The attention allocation may be performed on the image feature vector to allocate different attention weights to the images in the image attribute information. The attention weights of the images may reflect importance of the images in the multimedia resources. The greater the attention weight, the higher the importance. For example, a greater attention weight may be allocated to an image more similar to the feature vector corresponding to the statement. The second image-text fusion feature vector may be a feature vector obtained by weighting and summing the feature vectors corresponding to the images based on the attention weights corresponding to the images.

Furthermore, the computer device may obtain the attribute feature vector outputted by the image-text fusion feature sub-network obtained based on the first image-text fusion feature vector and the second image-text fusion feature vector. Specifically, the first image-text fusion feature vector and the second image-text fusion feature vector may be spliced to obtain the corresponding attribute feature vector.

The image-text fusion feature sub-network may be a network based on image-text multimodal machine learning. The term "multimodal machine learning," as used herein, refers to a capability to process and understand multi-source modal information using a machine learning method. Unimodal representation learning may be responsible for representing information as numerical vectors that can be processed by a computer or further abstracting the information to higher-level feature vectors. The term "multimodal representation learning," as used herein, refers to eliminating redundancy between multiple modes by using complementarity between the modes, so as to learn better feature representations. Therefore, the image-text fusion feature sub-network may eliminate redundancy between the image and the text by using complementarity between the image and the text, so as to learn better feature representation.

In an embodiment, the encoding the text attribute information using the text data processing channel to obtain an intermediate feature vector may include: performing word encoding on the text attribute information to obtain a word feature vector; and performing statement encoding on the word feature vector to obtain the intermediate feature vector.

In an aspect, after receiving the text attribute information, the text data processing channel may first perform word encoding on the text attribute information to obtain the word feature vector. In other words, word encoding may be sequentially performed on words in a text body of the multimedia resources in units of words to obtain the word feature vector. The word feature vector may include feature vectors respectively corresponding to the words. Then, statement encoding may be performed on the statement feature vector to obtain the intermediate feature vector. In other words, the feature vectors respectively corresponding to the words may be sequentially encoded in units of statements to obtain the intermediate feature vector. A statement expression may be obtained by word encoding, and a text expression may be obtained by statement encoding.

In an embodiment, the performing statement encoding on the word feature vector to obtain the intermediate feature vector may include: performing attention allocation on the word feature vector to obtain a statement feature vector, and performing statement encoding on the statement feature vector to obtain the intermediate feature vector. Specifically, for a statement, each word in the statement may have a different role and importance. Therefore, attention allocation may be performed on the word feature vector to obtain the statement feature vector. The attention allocation may be performed on the word feature vector to allocate different attention weights to words in a statement. The attention weights of the words may reflect importance of the words in the statement. In an aspect, the attention allocation may be performed on the word feature vector based on a target vector. During the model training, parameters of the target vector may be constantly adjusted to obtain the most suitable target vector. The statement feature vector may include feature vectors respectively corresponding to the statements. Statement encoding may be performed on the statement feature vector to obtain the intermediate feature vector. In other words, the feature vectors respectively corresponding to the words may be sequentially encoded in units of statements to obtain the intermediate feature vector.

In an embodiment, the text attribute information may be encoded using a transformer model to obtain the intermediate feature vector. The image attribute information may be encoded using a convolutional neural network (CNN) model to obtain the image feature vector.

Figure 7:
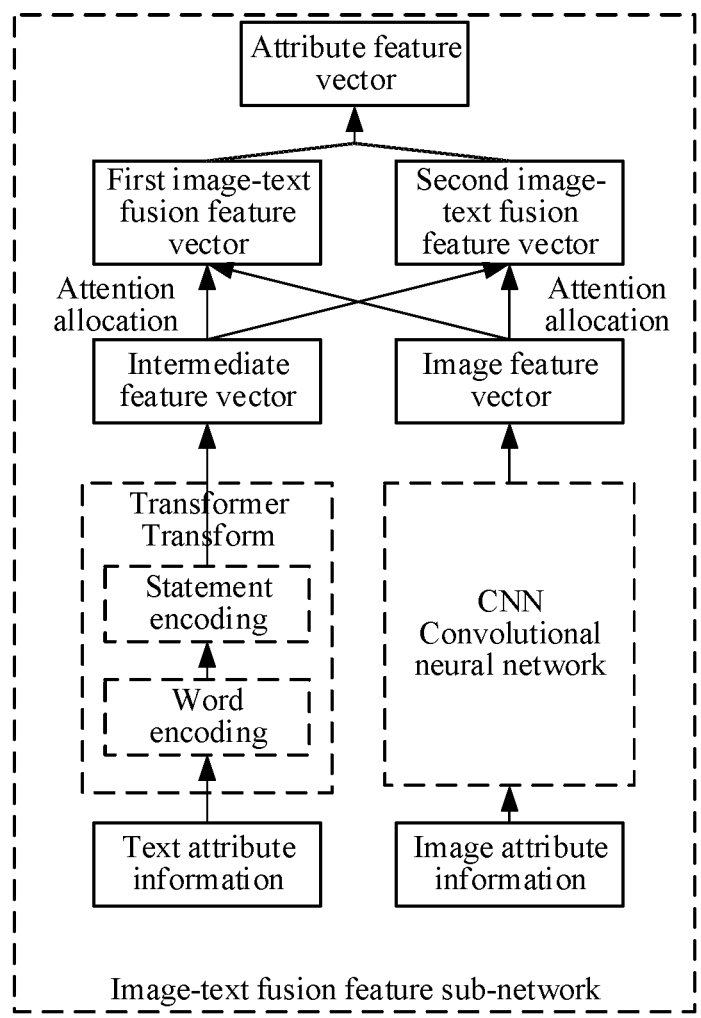
FIG. 7 is a schematic structural diagram of an image-text fusion feature sub-network according to an embodiment of this disclosure.

Referring to FIG. 7, the target attribute information associated with the image-text fusion feature sub-network may include text attribute information and image attribute information. The image-text fusion feature sub-network may perform word encoding and statement encoding on the text attribute information using the transformer model to obtain the intermediate feature vector. The image-text fusion feature sub-network may encode the image attribute information using the CNN model to obtain the image feature vector. Next, attention allocation may be performed on the intermediate feature vector based on the image feature vector to obtain a first image-text fusion feature vector, attention allocation may be performed on the image feature vector based on the intermediate feature vector to obtain a second image-text fusion feature vector, and the first image-text fusion feature vector and the second image-text fusion feature vector may be spliced to obtain an attribute feature vector.

In this embodiment, the text attribute information and the image attribute information may be organically fused together using the image-text fusion feature sub-network, and redundancy between the text and the image may be eliminated by using complementarity between the text and the image, so as to learn feature representation of text-image information that better represents the multimedia resources.

In an embodiment, the feature sub-networks may include a style feature sub-network, and target attribute information associated with the style feature sub-network may include style attribute information. The style feature sub-network may include a first data processing channel and a second data processing channel. The vectorizing, using the feature sub-networks in the multimedia resource classification model, target attribute information associated with the feature sub-networks may include: encoding the style attribute information using the first data processing channel to obtain an initial feature vector, and performing attention allocation on the initial feature vector to obtain a first feature vector; convolving the style attribute information using the second data processing channel to obtain a second feature vector; and obtaining an attribute feature vector outputted by the style feature sub-network based on the first feature vector and the second feature vector.

The term "style attribute information," as used herein, refers to information layout related attribute information in the multimedia resources, that is, image-text layout information of the multimedia resources. For example, if the multimedia resources are articles including pictures, the style attribute information may be style attribute information formed by sequentially arranging paragraphs and pictures in order of appearance.

In an aspect, the multimedia resource classification model may include a style feature sub-network. The style feature sub-network may be configured to process style attribute information. After the target attribute information set is inputted into the multimedia resource classification model, the style attribute information in the target attribute information set may be inputted into the style feature sub-network. The style feature sub-network may include a first data processing channel and a second data processing channel. The first data processing channel and the second data processing channel may be used for performing data processing on the style attribute information in different manners.

The style feature sub-network may encode the style attribute information using the first data processing channel to obtain the initial feature vector, and may perform attention allocation on the initial feature vector to obtain the first feature vector. In an aspect, style sub-information in the style attribute information may be taken as units to sequentially encode the style sub-information to obtain the initial feature vector. The initial feature vector may include feature vectors respectively corresponding to the style sub-information. Next, attention allocation may be performed on the initial feature vector to obtain the first feature vector. The attention allocation may be performed on the initial feature vector to allocate different attention weights to the style sub-information. The attention weights of the style sub-information may reflect importance of the style sub-information in the multimedia resources. For example, the style attribute information may include a paragraph 1, a paragraph 2, a picture 1, and a paragraph 3. The style attribute information may be encoded to obtain the initial feature vector formed by a feature vector corresponding to the paragraph 1, a feature vector corresponding to the paragraph 2, a feature vector corresponding to the picture 1, and a feature vector corresponding to the paragraph 3. Next, attention allocation may be performed on the feature vectors to allocate attention weights to the feature vectors, and the feature vectors and the corresponding attention weights may be weighted and summed to obtain the first feature vector. The first data processing channel may be mainly used for learning features between the style sub-information in the style attribute information.

The style feature sub-network may convolve the style attribute information using the second data processing channel to obtain the second feature vector. The second data processing channel may be mainly used for learning an overall feature of the style attribute information.

Furthermore, the attribute feature vector outputted by the style feature sub-network may be obtained based on the first feature vector and the second feature vector. Specifically, the first feature vector and the second feature vector may be spliced to obtain the attribute feature vector.

Figure 8:
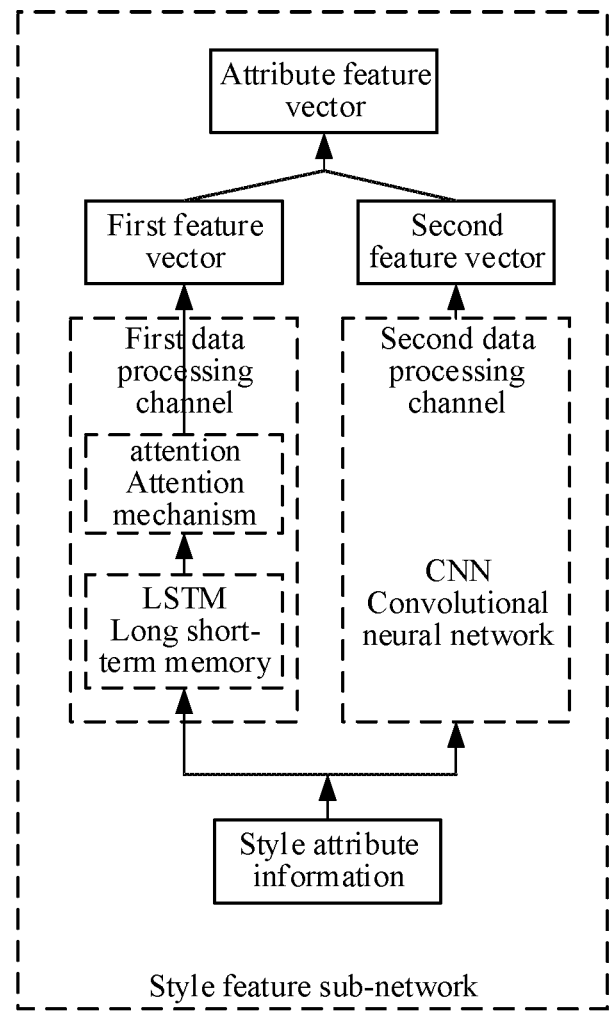
FIG. 8 is a schematic structural diagram of a style feature sub-network according to an embodiment of this disclosure.

Referring to FIG. 8, the target attribute information associated with the style feature sub-network may include style attribute information. The style feature sub-network may encode the style attribute information using a long short-term memory (LSTM) model to obtain an initial feature vector, may perform attention allocation on the initial feature vector using an attention layer to obtain a first feature vector, may convolve the style attribute information through the CNN model to obtain a second feature vector, and may splice the first feature vector and the second feature vector to obtain an attribute feature vector.

The style attribute information may also be encoded by using another model, such as a gate recurrent unit (GRU, recurrent neural network). The style attribute information may be encoded by using another machine learning model other than a convolution model.

In this embodiment, different data processing may be performed on the style attribute information using different data processing channels, so that feature vectors of the style attribute information may be represented from different perspectives. It may be beneficial for the model to learn knowledge associated with styles.

In an embodiment, the task sub-networks may each include an expert layer, a gating layer, and a fusion layer. The task sub-networks may share the expert layer. The inputting the attribute feature vectors into the task sub-networks to obtain prediction labels corresponding to the tasks may include: performing feature processing on the attribute feature vectors using the expert layer in a current task sub-network to obtain feature processing results, weighting the feature processing results using the gating layer to obtain intermediate processing results, and fusing the intermediate processing results using the fusion layer to obtain the prediction label of the task corresponding to the current task sub-network.

In an aspect, the multimedia resource classification model may include a plurality of task sub-networks. The plurality of task sub-networks may each include an expert layer, a gating layer, and a fusion layer. After the feature sub-networks output the attribute feature vectors, the attribute feature vectors may be inputted into the task sub-networks. Feature processing may be performed on the attribute feature vectors using the expert layer in the current task sub-network to obtain feature processing results, the feature processing results may be weighted using the gating layer to obtain intermediate processing results, and the intermediate processing results may be fused using the fusion layer to obtain the prediction label of the task corresponding to the current task sub-network. All the task sub-networks may output prediction labels.

Figure 9A:
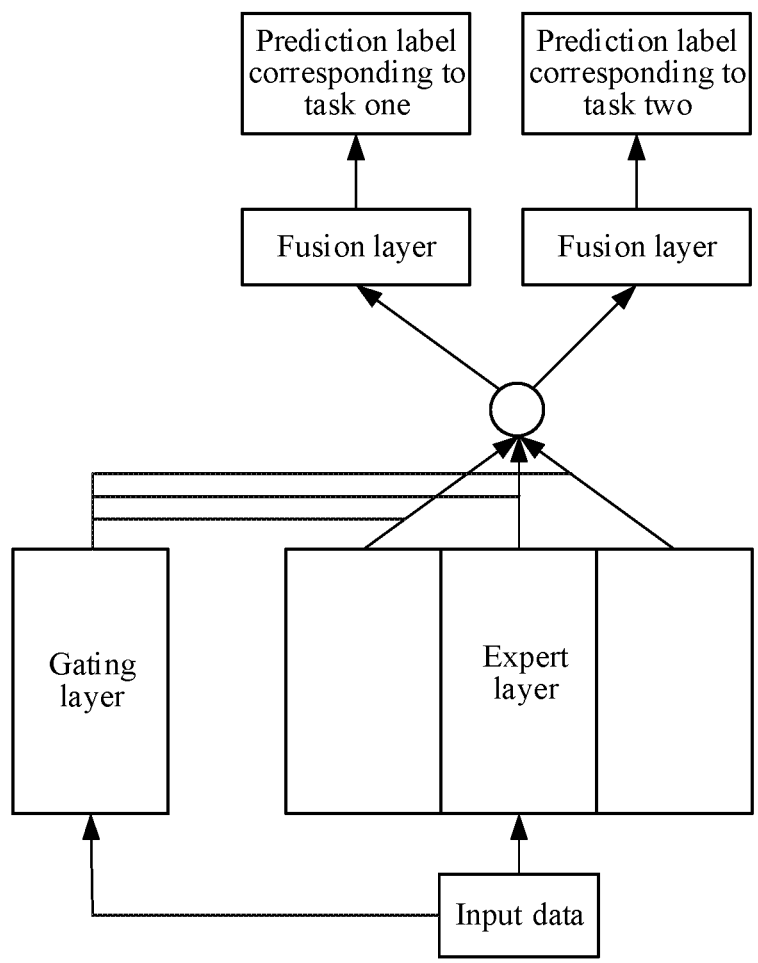
FIG. 9A is a schematic structural diagram of a task sub-network according to an embodiment of this disclosure.

In an embodiment, the task sub-networks may share the expert layer as well as the gating layer. Referring to FIG. 9A, the expert layer may be further divided into a plurality of expert sub-layers. At a same scale, a single network may not effectively learn common expressions between all tasks, but after a plurality of sub-networks are obtained by division, each sub-network may be able to learn some relevant and unique expressions in a certain task. Next, output of the expert sub-layers may be weighted through output of the gating layer, and may be transmitted to multiple fully connected layers of the task sub-networks. A specific task may be learned well. In other words, a plurality of underlying expert sub-layers may learn different knowledge, and different expert sub-layers may focus on different tasks. Some experts may learn common knowledge patterns, while other experts may learn independent knowledge patterns.

Figure 9B:
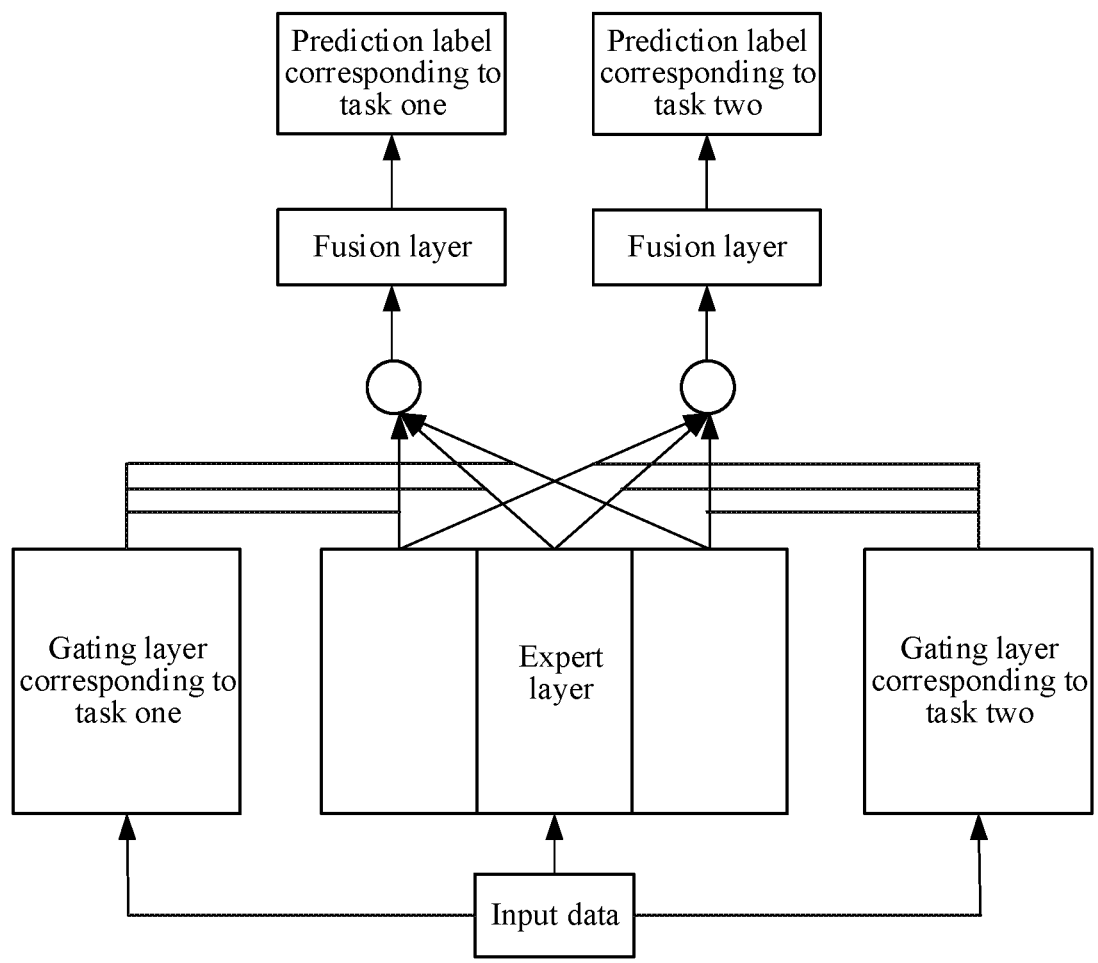
FIG. 9B is a schematic structural diagram of a task sub-network according to another embodiment of this disclosure.

In an embodiment, the task sub-networks may share only the expert layer. Referring to FIG. 9B, corresponding gating layers may be provided for different tasks. Advantageously, task-specific functions may be learned to balance shared expressions without addition of a large number of new parameters, so as to more explicitly model a relationship between the tasks. Differences between the tasks may be captured under a requirement of not increasing model parameters. On the one hand, the gating layer may be lightweight, and the expert layer may be shared by all the tasks, which may provide an advantage in computation amount and parameter quantity. On the other hand, each task may use a separate gating layer as opposed to all the tasks sharing a gating layer. The gating layer of each task may make selective use of the expert sub-layer by finally outputting different weights. The gating layers of different tasks may learn different patterns of combined feature processing results, so that the model may consider capturing correlation and distinction of different tasks.

The task prediction results may be expressed as: $y^k = h^k(f^k(x))$, $f^k(x) = \sum_{i=1}^{n} g^k(x)_i f_i(x)$, and $g^k(x) = \text{softmax}(W_{gk}x)$. Where $y^k$ may denote the task prediction result of a $k^{th}$ task. $h^k(x)$ may denote data processing of the fusion layer of the $k^{th}$ task. $f^k(x)$ may denote data processing of the expert layer and the gating layer of the $k^{th}$ task. $g^k(x)$ may denote data processing of the gating layer of the $k^{th}$ task. i may denote an $i^{th}$ expert sub-layer. n may denote n expert sub-layers. $f_i(x)$ may denote data processing of the $i^{th}$ expert sub-layer. $g^k(x)_i$ may denote a weight corresponding to a data processing result of the $i^{th}$ expert sub-layer for the $k^{th}$ task.

The term "expert layer," as used herein, refers to an expert network in a multi-task model, the term "gating layer," as used herein, refers to a gate network in the multi-task model, and the term "fusion layer," as used herein, refers to an output layer in the multi-task model.

Figure 9C:
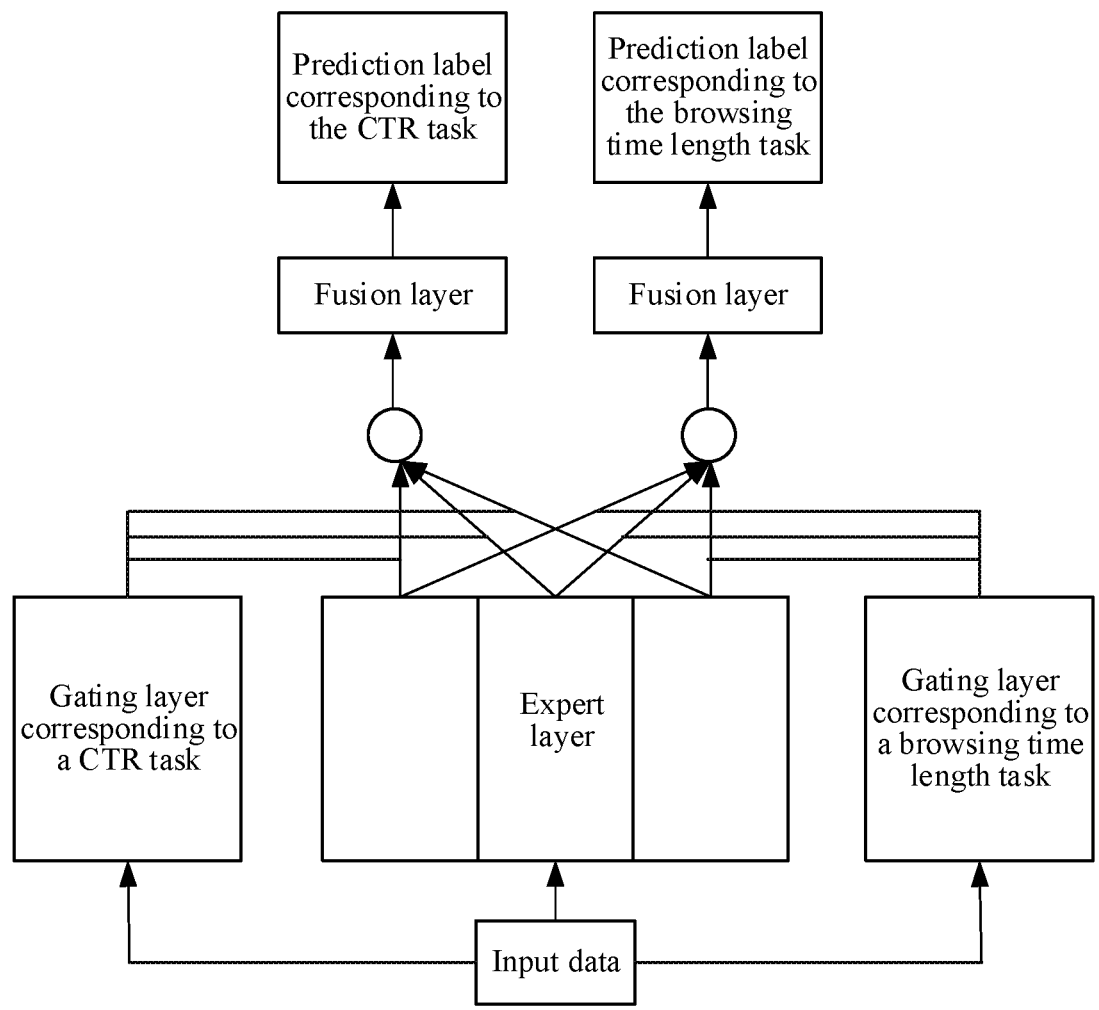
FIG. 9C is a schematic structural diagram of a task sub-network according to yet another embodiment of this disclosure.

Referring to FIG. 9C, the multimedia resource classification model may specifically include a task sub-network corresponding to a CTR task and a task sub-network corresponding to a browsing time length task. The two task sub-networks may share the expert layer. The two task sub-networks may include respective gating layers and fusion layers. After processing input data, the two task sub-networks may respectively output a prediction label corresponding to the CTR task and a prediction label corresponding to the browsing time length task.

Figure 10:
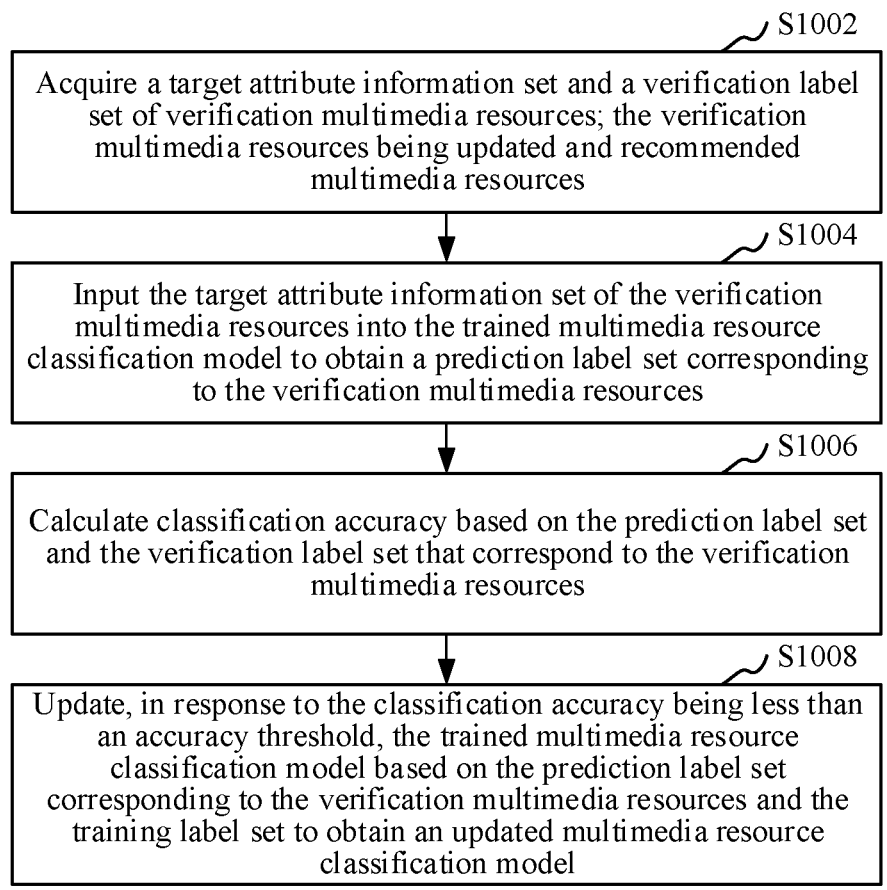
FIG. 10 is a schematic flowchart of updating a multimedia resource classification model according to an embodiment of this disclosure.

In an embodiment, as shown in FIG. 10, the multimedia resource classification model training method may include the following steps:

In step S1002: a target attribute information set and a verification label set of verification multimedia resources are acquired; the verification multimedia resources and recommended multimedia resources may be updated.

In step S1004: the target attribute information set of the verification multimedia resources is inputted into the trained multimedia resource classification model to obtain a prediction label set corresponding to the verification multimedia resources.

In step S1006: classification accuracy is calculated based on the prediction label set and the verification label set that correspond to the verification multimedia resources.

In step S1008: in response to the classification accuracy being less than an accuracy threshold, the trained multimedia resource classification model is updated based on the prediction label set corresponding to the verification multimedia resources and the training label set to obtain an updated multimedia resource classification model.

The verification multimedia resources may be multimedia resources used for verifying accuracy of the multimedia resource classification model. The term "verification labels," as used herein refer to quality labels of the verification multimedia resources. The verification multimedia resources and the training multimedia resources may be different multimedia resources. The verification multimedia resources may be updated and recommended multimedia resources. The verification multimedia resources may be multimedia resources published later than the training multimedia resources. In other words, the verification multimedia resources may be newly published and newly recommended multimedia resources after the training multimedia resources are published.

In an aspect, users' feedback and evaluation on the multimedia resources may be subjective, and the users' subjective preferences to the multimedia resources may change in real time with popularity of user groups and the multimedia resources. Therefore, there is a need to update the multimedia resource classification model to maintain accuracy and adaptability of the multimedia resource classification model. The computer device may acquire recently published historical multimedia resources as the verification multimedia resources, may determine the verification label set of the verification multimedia resources based on the latest recommendation interaction information set, and may then perform model testing on the resource classification model based on the verification multimedia resources. If the performed testing is passed, there is no need to update the multimedia resource classification model. If the performed testing is not passed, the multimedia resource classification model may be updated based on the verification multimedia resources. During the model testing, the computer device may acquire a target attribute information set of the verification multimedia resources, and may input the target attribute information set of the verification multimedia resources into the trained multimedia resource classification model. The task sub-networks in the multimedia resource classification model may respectively output prediction labels corresponding to the tasks, so as to obtain the prediction label set. The computer device may then calculate the classification accuracy of the multimedia resource classification model based on the prediction label set and based on the verification label set that correspond to the verification multimedia resources. If the classification accuracy is greater than or equal to the accuracy threshold, it may indicate that the multimedia resource classification model may still maintain higher accuracy, and the model testing may be passed. If the classification accuracy is less than the accuracy threshold, it may indicate that the multimedia resource classification model has low accuracy, and the model may need to be updated. The computer device may calculate training loss values based on the prediction label set corresponding to the verification multimedia resources and the training label set, may perform back propagation based on the training loss values, and may update model parameters of the trained multimedia resource classification model until the convergence condition is satisfied, so as to obtain an updated multimedia resource classification model. The updated multimedia resource classification model may be applicable to a current recommendation environment and may identify multimedia resources that the users are currently more interested in.

Figure 11:
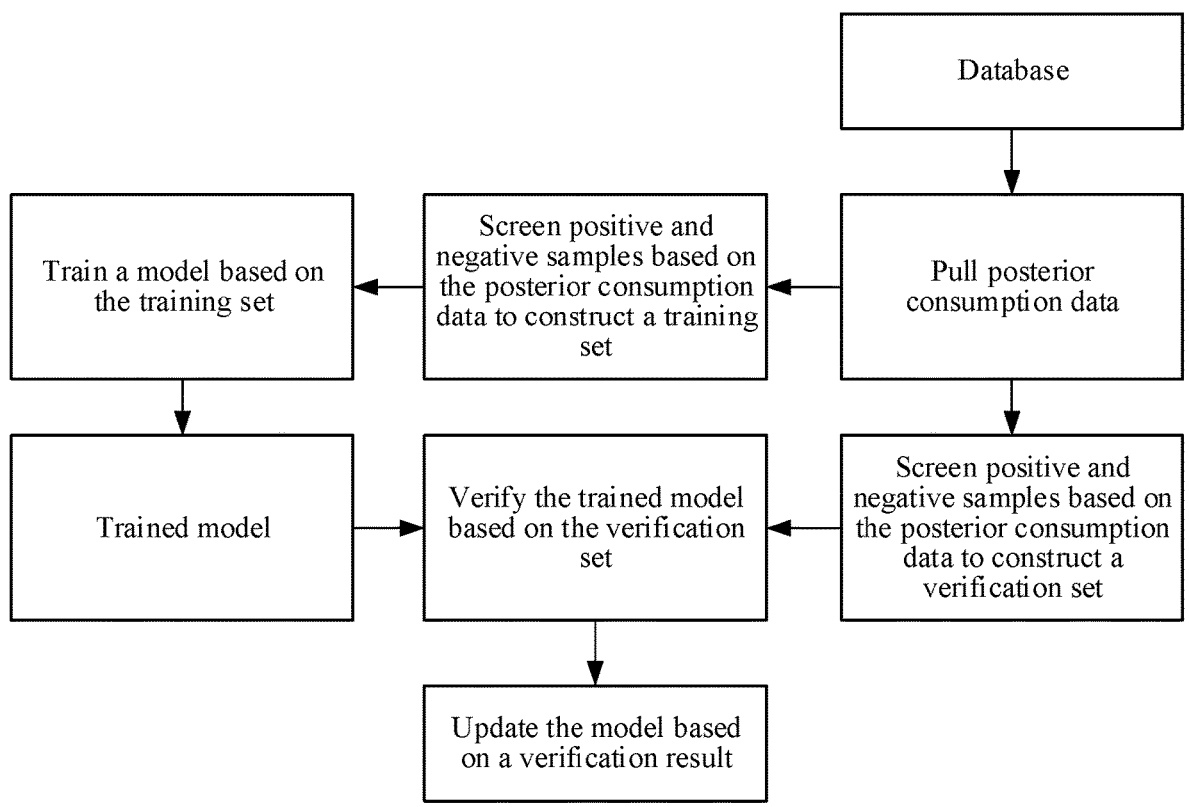
FIG. 11 is a schematic flowchart of training and updating a multimedia resource classification model method according to an embodiment of this disclosure.

After the multimedia resources are published, posterior consumption data of the multimedia resources may be stored in databases of the resource service platforms. The term "posterior consumption data," as used herein, refers to the recommendation interaction information. The posterior consumption data records interactive behaviors between the multimedia resources and the users, such as CTRs and thumbs-up rates of the multimedia resources. Referring to FIG. 11, the computer device may acquire posterior consumption data of historical multimedia resources from the databases, and may select positive and negative samples based on the posterior consumption data to build a training set and a verification set. The positive sample may indicate that the quality label corresponding to the historical multimedia resource on a certain task is a positive label, while the negative sample may indicate that the quality label corresponding to the historical multimedia resource on a certain task is a negative label. The computer device may select one part of the historical multimedia resources as the training set, and may train the multimedia resource classification model based on the training set to obtain the trained multimedia resource classification model. The computer device may acquire the other part of the historical multimedia resources as the verification set, may verify the trained multimedia resource classification model based on the verification set, and may calculate classification accuracy of the trained multimedia resource classification model based on the verification set. If the classification accuracy is less than the accuracy threshold, the trained multimedia resource classification model may be updated based on the verification set. In addition, when determining the quality labels of the multimedia resources, the computer device may determine quality labels of the historical multimedia resources in the training set based on posterior consumption data of the training set, and may determine quality labels of the historical multimedia resources in the verification set based on posterior consumption data of the verification set, preventing interference between the training set and the verification set. It may be understood that the computer device may periodically update the latest multimedia resource classification model to ensure that the multimedia resource classification model always adapts to the current recommendation environment.

In an embodiment, if a coincidence degree of a prediction label set and a verification label set of a multimedia resource is greater than a coincidence degree threshold, it may be determined that the multimedia resource classification model is accurate in quality classification of the multimedia resources, and model prediction is accurate. Then, statistics may be calculated on proportions of the multimedia resources accurately predicted in the verification set to obtain the classification accuracy of the multimedia resource classification model.

Figure 12:
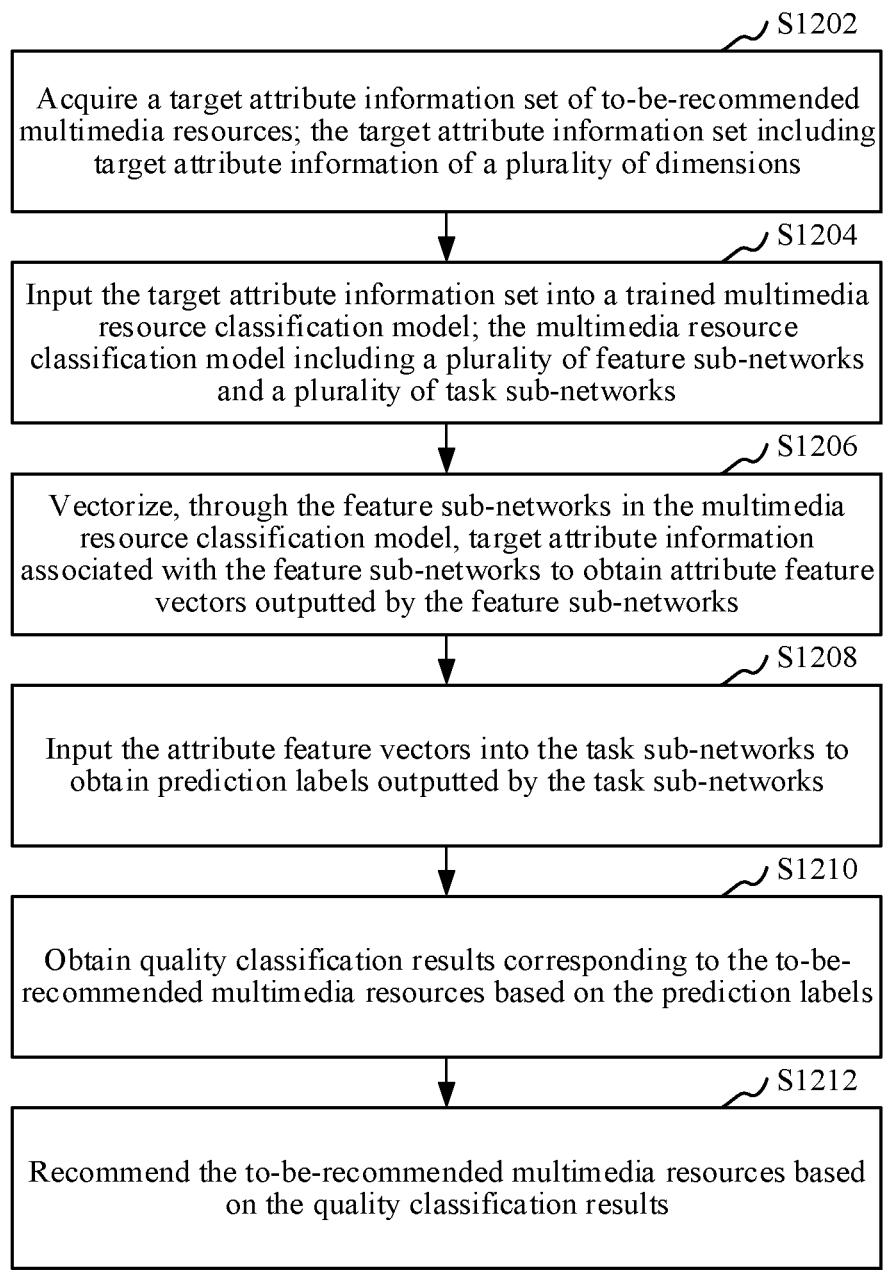
FIG. 12 is a schematic flowchart of a multimedia resource recommendation method according to an embodiment of this disclosure.

In an embodiment, as shown in FIG. 12, a multimedia resource recommendation method is provided. Description is based on an example in which the method is applied to the computer device in FIG. 1. The computer device may be the terminal 102 or the server 104 in FIG. 1. Referring to FIG. 12, the multimedia resource recommendation method may include the following steps:

In step S1202: a target attribute information set of to-be-recommended multimedia resources is acquired; the target attribute information set may include target attribute information of a plurality of dimensions.

In step S1204: the target attribute information set is inputted into a trained multimedia resource classification model; the multimedia resource classification model may include a plurality of feature sub-networks and a plurality of task sub-networks.

In step S1206: target attribute information associated with the feature sub-networks is vectorized, using the feature sub-networks in the multimedia resource classification model, to obtain attribute feature vectors outputted by the feature sub-networks.

In step S1208: the attribute feature vectors are inputted into the task sub-networks to obtain prediction labels outputted by the task sub-networks.

In step S1210: quality classification results corresponding to the to-be-recommended multimedia resources are obtained based on the prediction labels.

In step S1212: the to-be-recommended multimedia resources are recommended based on the quality classification results.

In an aspect, in order to recommend more high-quality multimedia resources to the users and improve effectiveness of resource recommendation, prior to the multimedia resource recommendation, the computer device may use the trained multimedia resource classification model to identify high-quality multimedia resources from a plurality of multimedia resources, and may then recommend the high-quality multimedia resources to the users.

The computer device may analyze content of the multimedia resources to obtain the target attribute information set of the multimedia resources, and may input the target attribute information set of the multimedia resources into the trained multimedia resource classification model to obtain the quality classification results corresponding to multimedia resources.

The multimedia resource classification model may include a plurality of feature sub-networks and a plurality of task sub-networks. The feature sub-networks may be configured to transform the target attribute information into attribute feature vectors. Different feature sub-networks may be configured to process different target attribute information. The target attribute information associated with the feature sub-networks may be vectorized through the feature sub-networks in the multimedia resource classification model to obtain attribute feature vectors outputted by the feature sub-networks.

The task sub-networks may be configured to predict performance of the multimedia resources on specific tasks based on the attribute feature vectors. Different task sub-networks may correspond to different tasks. After obtaining the attribute feature vectors respectively outputted by the feature sub-networks, the computer device may input the attribute feature vectors into the task sub-networks, and the corresponding prediction labels may be obtained after the task sub-networks perform data processing on input data.

The computer device may predict the quality classification results corresponding to the multimedia resources based on the task prediction results. In an aspect, if a quantity of the task prediction results being positive labels is greater than a preset threshold, the quality classification results may be determined to be positive labels. For example, if all the task prediction results are positive labels, the quality classification results may be determined to be positive labels. If more than half of the task prediction results are positive labels, the quality classification results may be determined to be positive labels. The multimedia resource classification model may output the quality classification results corresponding to the to-be-recommended multimedia resources. Alternatively, the multimedia resource classification model may output the prediction models and may determine the quality classification results based on the prediction labels outside the model. Alternatively, the multimedia resource classification model may output the prediction models and the quality classification results.

After obtaining the quality classification results of the multimedia resources, the computer device may perform recommendation weighting on high-quality multimedia resources and may perform recommendation weighting reduction on low-quality multimedia resources. This recommendation method may effectively recommend high-quality multimedia resources with high tonality and attractiveness to the users, and may improve the effectiveness of resource recommendation.

Specific processes of training and updating a training multimedia resource classification model may be obtained with reference to the methods described in the relevant embodiments of the foregoing multimedia resource classification model training method, and a model structure and a data processing process of the multimedia resource classification model may also be obtained with reference to the methods described in the relevant embodiments of the foregoing multimedia resource classification model training method.

In the above multimedia resource recommendation method, the target attribute information set of the multimedia resources may be acquired. The target attribute information set may include target attribute information corresponding to a plurality of dimensions. The target attribute information set may be inputted into the trained multimedia resource classification model, the multimedia resource classification model may include a plurality of feature sub-networks and a plurality of task sub-networks. The target attribute information associated with the feature sub-networks may be vectorized using the feature sub-networks in the multimedia resource classification model to obtain the attribute feature vectors outputted by the feature sub-networks. The attribute feature vectors may be inputted into the task sub-networks to obtain the prediction labels outputted by the task sub-networks. The quality classification results corresponding to the to-be-recommended multimedia resources may be obtained based on the prediction labels, and the multimedia resources may be recommended based on the quality classification results. The target attribute information set of the multimedia resources may include target attribute information corresponding to a plurality of dimensions. The target attribute information corresponding to different dimensions may reflect content quality of the multimedia resources from different perspectives. The target attribute information set may be inputted into the multimedia resource classification model, and quality of the multimedia resources may be accurately classified using comprehensive consideration of the target attribute information of the dimensions, so as to obtain accurate quality classification results. In addition, the multimedia resource classification model may include a plurality of task sub-networks. The multimedia resource classification model may be a multi-task model and may predict performance of the multimedia resources on the tasks. The quality classification results of the multimedia resources may be obtained by integrating the performance of the multimedia resources on the tasks, which may further improve accuracy of quality classification of the multimedia resources. Furthermore, multimedia resources with better quality may be identified using the multimedia resource classification model, so as to recommend the multimedia resources with better quality to the users, which may improve the effectiveness of the multimedia resource recommendation. Effective multimedia resource recommendation may prevent the users' repeated searches or repeated interface refreshes caused by low-quality and ineffective multimedia resource recommendations. The repeated searches or repeated interface refreshes may occupy a large number of resources of a computer device. Therefore, a waste of resources of the computer device may also be reduced on the basis of the improvement of the effectiveness of resource recommendations.

Figure 13A:
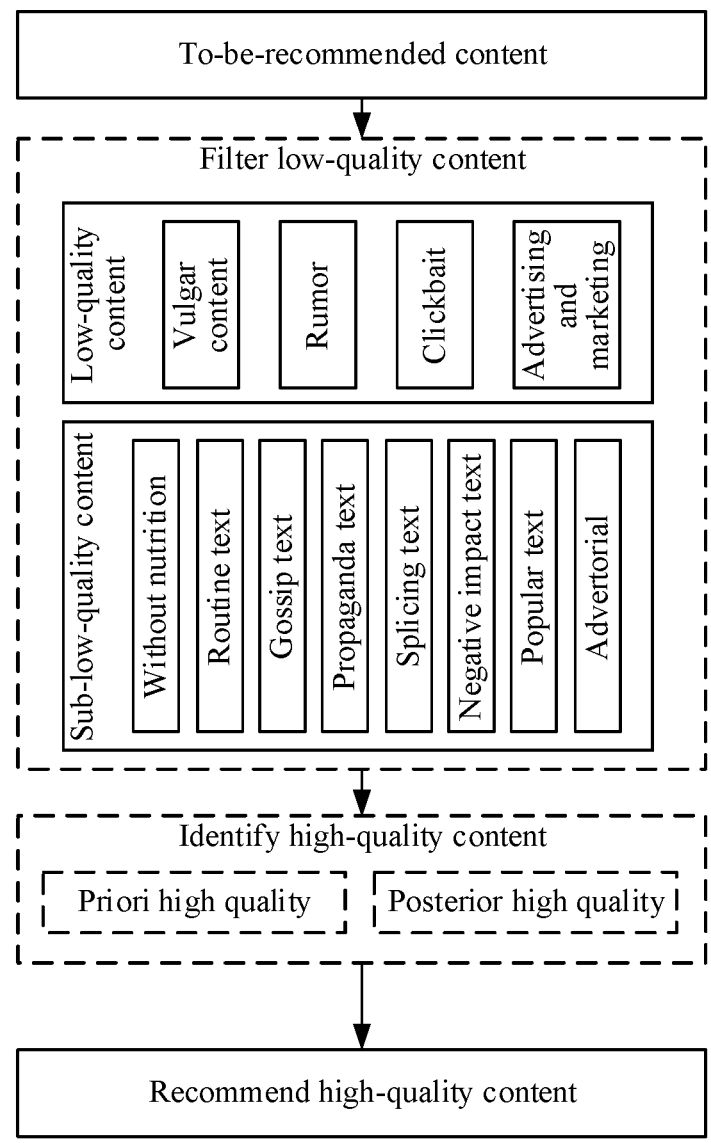
FIG. 13A is a schematic flowchart of recommending high-quality content according to an embodiment of this disclosure.

This disclosure further provides an application scenario. The above multimedia resource classification model training and multimedia resource recommendation methods are applied to the application scenario. Specifically, the above methods are applied to an image-text content recommendation application scenario as follows:

Referring to FIG. 13A, when recommending image-text content, a resource service platform may first filter low-quality content and then identify high-quality content, and after the high-quality content is out of the database, may perform weighted recommendation on the high-quality content, so as to effectively first recommend high-quality content with high tonality and attractiveness to the users, which may improve the effectiveness of recommendation.

1. Filter Low-Quality Content

The low-quality content specifically may include, but is not limited to, vulgar content, rumors, clickbait, and advertising and marketing image-text content. Sub-low-quality content may specifically include, but is not limited to, image-text content without nutrition, routine text, gossip text, propaganda text, splicing text, negative impact text, popular text, advertorial, and other image-text content. The server may first filter the above low-quality content.

2. Identify High-Quality Content

High-quality content identification methods may include priori high quality and posterior high quality methods. The term "priori high quality," as used herein, refers to identification, from image-text content, of the high-quality content from objective perspectives of text quality, picture quality, and image-text layout. The term "posterior high quality," as used herein, refers to comprehensive identification, from image-text content and further consideration of the users' evaluation on the image-text content, of the high-quality content from objective and subjective perspectives.

Figure 13B:
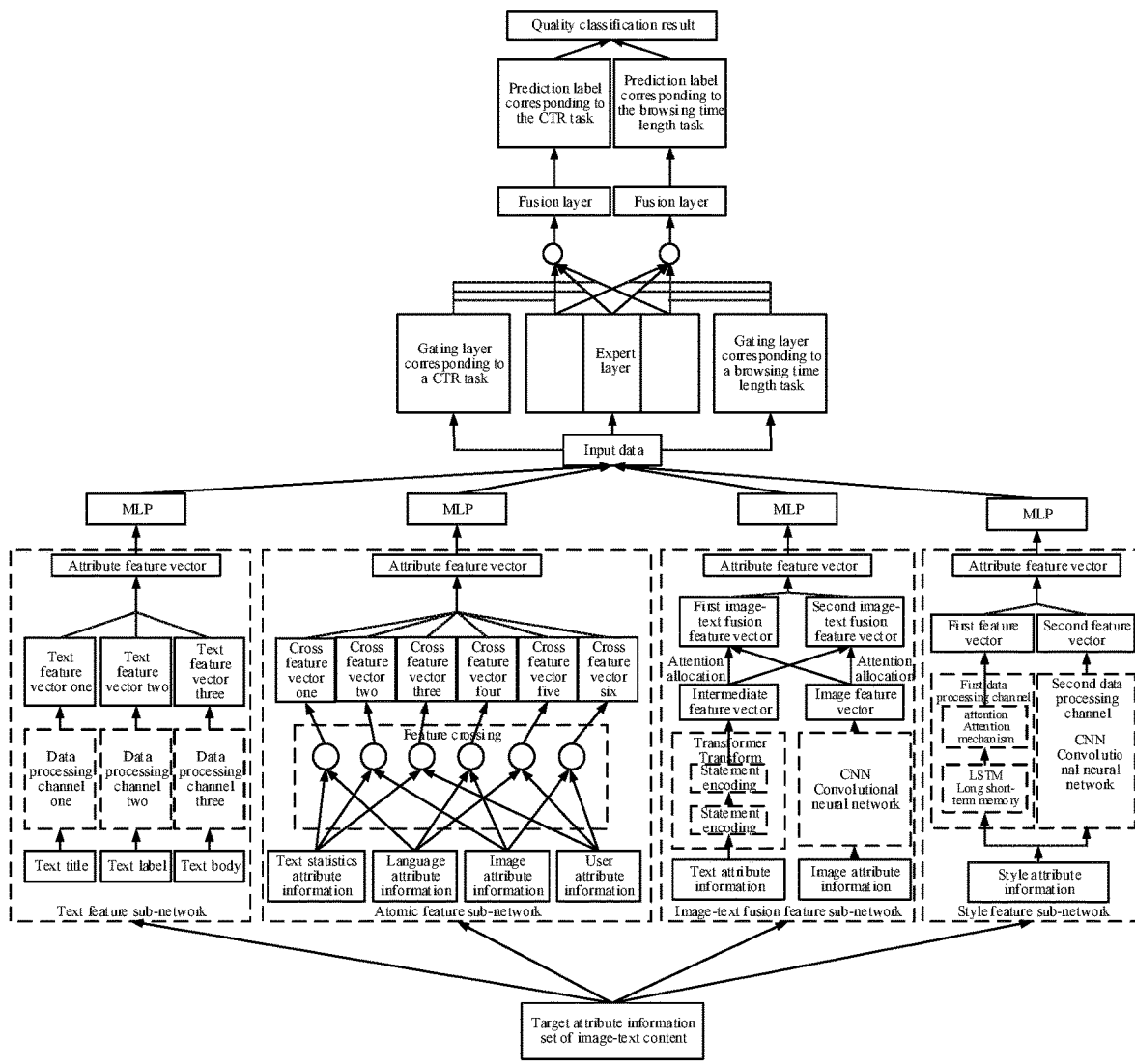
FIG. 13B is a schematic structural diagram of an image-text content classification model according to an embodiment of this disclosure.

The server may train a model for image-text posterior high-quality identification. Firstly, deep network modeling may be completed by constructing features from various content dimensions such as image-text multi-mode, article layout, account numbers, and linguistics, and a multi-task based image-text content classification model may be established. A model structure of an image-content classification model may be obtained with reference to FIG. 13B. The model may include a text feature sub-network, an atomic feature sub-network, an image-text fusion feature sub-network, and a style feature sub-network. Data outputted by the feature sub-networks may be outputted to the task sub-networks. The task sub-networks output task prediction results, and quality classification results corresponding to input data may be obtained based on the task prediction results. The feature sub-networks and the task sub-networks may be connected using a multi-layer perceptron (MLP, multi-layer neural network) layer. The model in FIG. 13B includes a task sub-network for predicting CTRs and a task sub-network for predicting browsing time lengths, that is, a task sub-network corresponding to a CTR task and a task sub-network corresponding to a browsing time length task.

Figure 13C:
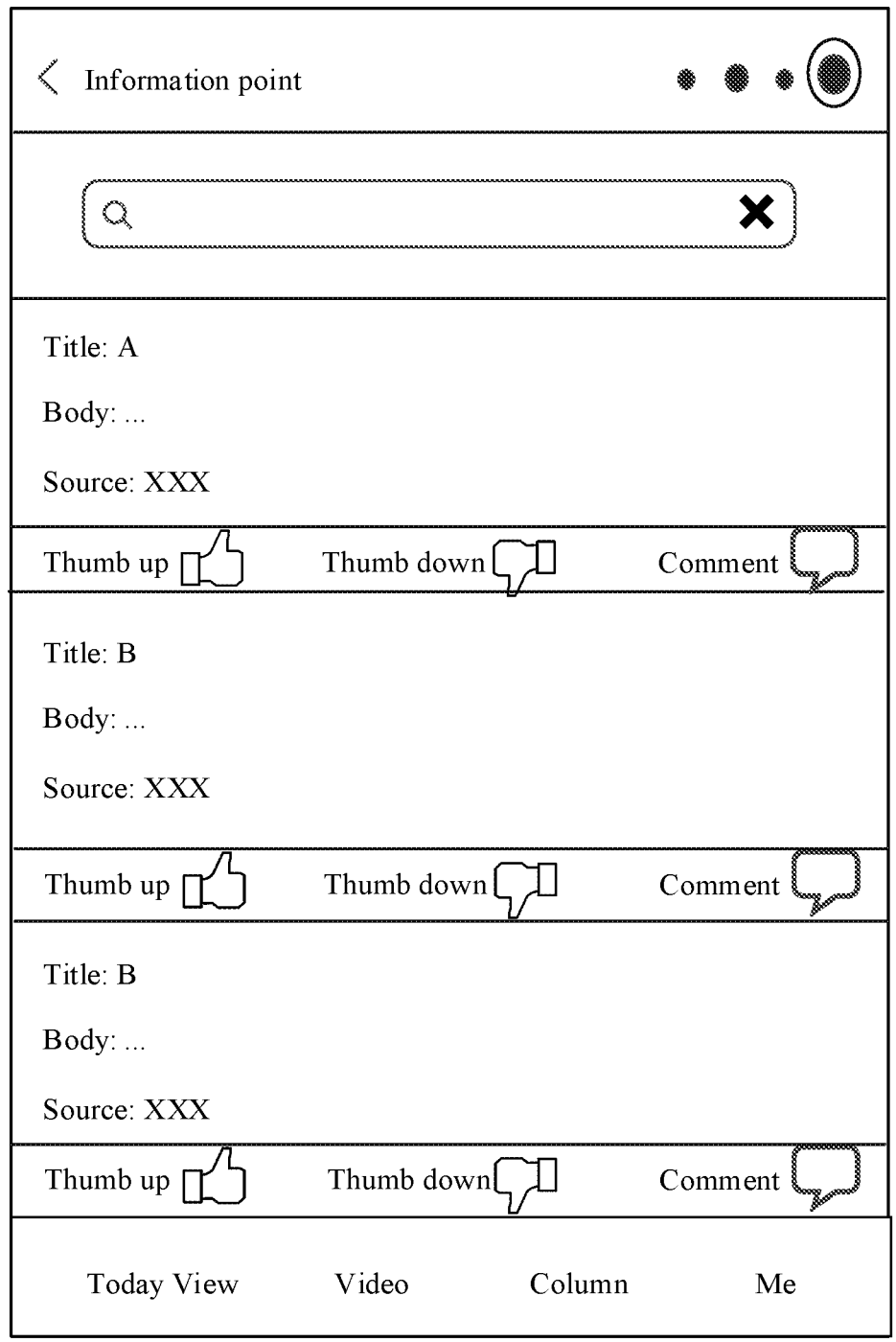
FIG. 13C is a schematic interface diagram of an image-text recommendation interface according to an embodiment of this disclosure.

Next, understanding of the high-quality content may be driven by using the users' posterior consumption data. High-quality image-text positive and negative samples may be screened out by using the posterior consumption data to establish a training set and a verification set. Referring to FIG. 13C, when browsing information in an information point applet, a user may thumb up, thumb down, comment, click, and browse main bodies of information articles, and the background may conduct statistics on such operation data to obtain posterior consumption data, such as CTRs, thumbs-up rates, and browsing time lengths.

Further, the model may be trained based on the training set to obtain a trained image-text content classification model. The trained image-text content classification model may be configured to classify quality of image-text content. Quality classification results corresponding to the image-text content can be obtained by inputting target attribute information set of the image-text content into the image-text content classification model.

3. Recommend High-Quality Content

When the quality classification results show that the to-be-recommended image-text content is high-quality content, weighted recommendation may be performed on the high-quality content.

The accuracy may reach about 95% after the model goes online. After recommendation weighting experiments are conducted on the identified high-quality image-text content on a browser side, the high-quality content with good reading experience and attractiveness may be first recommended to the users, and a good service effect may be achieved on a service side. On the browser side, overall image-content click may be increased by 0.946%, a total image-content browsing time length may be increased by 1.007%, an image-content CTR may be increased by 0.729%, and an average comment rate in interactive index data may be increased by 0.416%.

Further, after the model is trained, the model may be irregularly tested based on the verification set. If a testing result shows that the accuracy of the model is low, the model may be updated to ensure the accuracy of the model. In addition, update time of the model may also tested and analyzed, and testing results are shown in Table 1. According to the testing results, an automatic update cycle of the model may be set to 5 days to maintain higher accuracy of the model.

TABLE 1

| Decay time | Decay of high-quality proportion | AUC decay |
|---|---|---|
| 5 days | 0.452% | 0.031% |
| 7 days | 0.831% | 0.126% |
| 10 days | 1.856% | 0.705% |

In this embodiment, an automatic model update scheme of performing image-text posterior high-quality identification based on multi-task and image-content multi-mode, article layout, account numbers, linguistics, etc., is an innovation in algorithms and model structures based on a specific service scenario. Understanding of the high-quality content is driven by using the users' posterior consumption data. High-quality image-text positive and negative samples may be screened out by using the posterior consumption data, deep network modeling may be completed by constructing features from various content dimensions such as image-text multi-mode, article layout, account numbers, and linguistics, and latest consumption content rules may be continuously captured by using the automatic model update scheme, which may optimize the problem of real-time changes of user groups' subjective consumption preferences over time and may improve the effectiveness of resource recommendation.

The steps in FIG. 2 to FIG. 13B are sequentially displayed as indicated by arrows, but the steps are not necessarily sequentially performed in an order indicated by the arrows. Unless clearly specified in this specification, there is no strict sequence limitation on the execution of the steps, and the steps may be performed in another sequence. In addition, at least some steps in FIG. 2 to FIG. 13B may include a plurality of steps or a plurality of stages. The steps or the stages are not necessarily performed at the same moment, and instead may be performed at different moments. A performing sequence of the steps or the stages is not necessarily performed in sequence, and instead may be performed in turn or alternately with another step or at least some of steps or stages of the another step.

Figure 14:
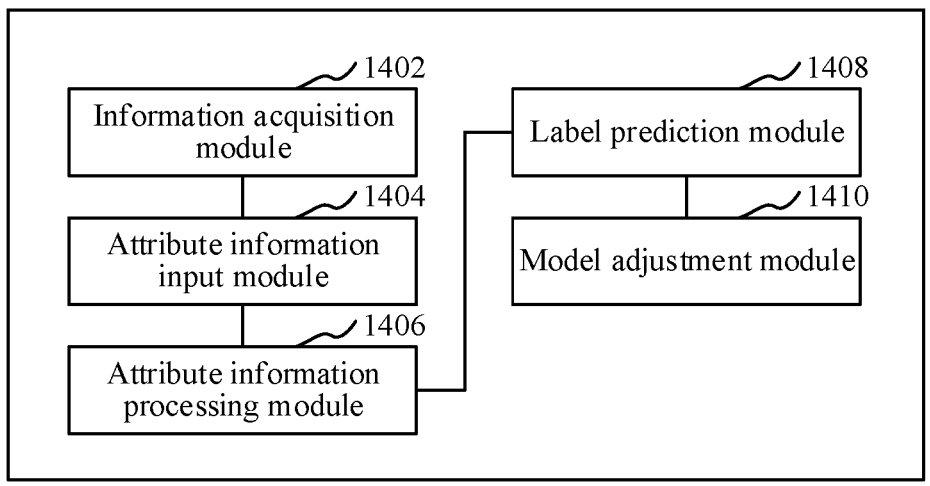
FIG. 14 is a structural block diagram of a multimedia resource classification model training apparatus according to an embodiment of this disclosure.

In an embodiment, as shown in FIG. 14, a multimedia resource classification model training apparatus is provided. The apparatus may use a software module or a hardware module, or a combination of both as part of a computer device. The apparatus may specifically include: an information acquisition module 1402, an attribute information input module 1404, an attribute information processing module 1406, a label prediction module 1408, and a model adjustment module 1410.

The information acquisition module 1402 may be configured to acquire a target attribute information set and a training label set of training multimedia resources. The target attribute information set may include target attribute information corresponding to a plurality of dimensions, and the training label set may include training labels corresponding to a plurality of tasks.

The attribute information input module 1404 may be configured to input the target attribute information set of the training multimedia resources into a to-be-trained multimedia resource classification model. The multimedia resource classification model may include a plurality of feature sub-networks and task sub-networks corresponding to the tasks.

The attribute information processing module 1406 may be configured to vectorize, using the feature sub-networks in the multimedia resource classification model, target attribute information associated with the feature sub-networks to obtain attribute feature vectors outputted by the feature sub-networks.

The label prediction module 1408 may be configured to input the attribute feature vectors into the task sub-networks to obtain prediction labels corresponding to the tasks.

The model adjustment module 1410 may be configured to adjust parameters of the corresponding task sub-network based on the training label and the prediction label that correspond to a same task, and may adjust model parameters of the feature sub-networks based on the training labels and the prediction labels that correspond to the tasks until a convergence condition is satisfied, so as to obtain a trained multimedia resource classification model. The multimedia resource classification model may be configured to classify quality of to-be-recommended multimedia resources.

In the above multimedia resource classification model training apparatus, supervised training may be performed on the multimedia resource classification model based on the target attribute information set and the training label set of the training multimedia resources, so as to obtain a multimedia resource classification model that may accurately classify the quality of the multimedia resources. The target attribute information set of the multimedia resources may include target attribute information corresponding to a plurality of dimensions. The target attribute information of different dimensions may reflect content quality of the multimedia resources from different perspectives. The target attribute information set may be inputted into the multimedia resource classification model, and quality of the multimedia resources may be accurately classified using comprehensive consideration of the target attribute information of the dimensions, so as to obtain prediction labels that can accurately reflect the quality of the multimedia resources. In addition, the multimedia resource classification model may include a plurality of task sub-networks. The multimedia resource classification may be a multi-task model and may predict performance of the multimedia resources on the tasks. During model training, a plurality of related tasks may be simultaneously learned in parallel, and gradients may be simultaneously back propagated to learn connections and differences of different tasks, so as to improve learning efficiency and quality of each task. Furthermore, the trained multimedia resource classification model may be configured to classify the quality of the to-be-recommended multimedia resources, so as to recommend high-quality multimedia resources to users, which may improve effectiveness of multimedia resource recommendation. Effective multimedia resource recommendations may prevent the users' repeated searches or repeated interface refreshes caused by low-quality and ineffective multimedia resource recommendations. The repeated searches or repeated interface refreshes may occupy a large number of resources of a computer device. Therefore, a waste of resources of the computer device may also be reduced on the basis of the improvement of the effectiveness of resource recommendation.

In an embodiment, the information acquisition module may be further configured to acquire recommendation interaction information sets respectively corresponding to a plurality of historical multimedia resources; the recommendation interaction information sets may each include recommendation interaction information corresponding to the tasks; calculate statistics on the recommendation interaction information corresponding to a same task to obtain reference interaction information respectively corresponding to the tasks; classify quality of the historical multimedia resources based on the recommendation interaction information and the corresponding reference interaction information to obtain quality label sets corresponding to the historical multimedia resources; and obtain the training multimedia resources and the corresponding training label set based on the historical multimedia resources and the corresponding quality label sets.

In an embodiment, the information acquisition module may be further configured to compare, in the recommendation interaction information set corresponding to a same historical multimedia resource, a recommendation interaction degree corresponding to the recommendation interaction information and a reference interaction degree corresponding to the reference interaction information of a same task; the recommendation interaction degree may be obtained by normalizing the recommendation interaction information, and the reference interaction degree may be obtained by normalizing the reference interaction information; determine a quality label of the task corresponding to the recommendation interaction information whose recommendation interaction degree is greater than the reference interaction degree to be a positive label; and determine a quality label of the task corresponding to the recommendation interaction information whose recommendation interaction degree is less than or equal to the reference interaction degree to be a negative label.

In an embodiment, the feature sub-networks may include a text feature sub-network, target attribute information associated with the text feature sub-network may include a plurality of pieces of text attribute information, and the text feature sub-network may include data processing channels respectively corresponding to the plurality of pieces of text attribute information. The attribute information processing module may be further configured to vectorize, using the data processing channels in the text feature sub-network, the corresponding text attribute information to obtain text feature vectors outputted by the data processing channels; and obtain an attribute feature vector outputted by the text feature sub-network based on the text feature vectors.

In an embodiment, the feature sub-networks may include an atomic feature sub-network. The attribute information processing module may be further configured to perform, using the atomic feature sub-network, feature crossing on target attribute information associated with the atomic feature sub-network to obtain at least one cross feature vector; and obtain an attribute feature vector outputted by the atomic feature sub-network based on the cross feature vectors.

In an embodiment, the target attribute information associated with the atomic feature sub-network may include at least two of user attribute information, image attribute information, language attribute information, and text statistics attribute information.

In an embodiment, the feature sub-networks may include an image-text fusion feature sub-network, target attribute information associated with the image-text fusion feature sub-network may include text attribute information and image attribute information, and the image-text fusion feature sub-network may include a text data processing channel corresponding to the text attribute information and an image data processing channel corresponding to the image attribute information. The attribute information processing module may be further configured to encode the text attribute information using the text data processing channel to obtain an intermediate feature vector; encode the image attribute information using the image data processing channel to obtain an image feature vector; perform attention allocation on the intermediate feature vector based on the image feature vector to obtain a first image-text fusion feature vector; perform attention allocation on the image feature vector based on the intermediate feature vector to obtain a second image-text fusion feature vector; and obtain an attribute feature vector outputted by the image-text fusion feature sub-network based on the first image-text fusion feature vector and the second image-text fusion feature vector.

In an embodiment, the attribute information processing module may be further configured to perform word encoding on the text attribute information to obtain a word feature vector; and perform statement encoding on the word feature vector to obtain the intermediate feature vector.

In an embodiment, the feature sub-networks may include a style feature sub-network, and target attribute information associated with the style feature sub-network may include style attribute information. The style feature sub-network may include a first data processing channel and a second data processing channel. The attribute information processing module may be further configured to encode the style attribute information using the first data processing channel to obtain an initial feature vector, and perform attention allocation on the initial feature vector to obtain a first feature vector; convolve the style attribute information using the second data processing channel to obtain a second feature vector; and obtain an attribute feature vector outputted by the style feature sub-network based on the first feature vector and the second feature vector.

In an embodiment, the task sub-networks may each include an expert layer, a gating layer, and a fusion layer. The task sub-networks may share the expert layer. The label prediction module may be further configured to perform feature processing on the attribute feature vectors using the expert layer in a current task sub-network to obtain feature processing results, weight the feature processing results using the gating layer to obtain intermediate processing results, and fuse the intermediate processing results using the fusion layer to obtain the prediction label of the task corresponding to the current task sub-network.

Figure 15:
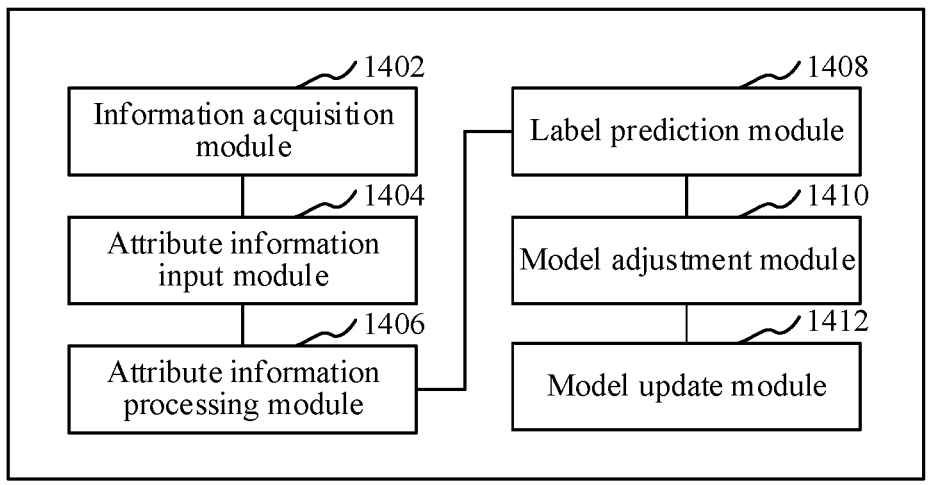
FIG. 15 is a structural block diagram of a multimedia resource classification model training apparatus according to another embodiment of this disclosure.

In an embodiment, as shown in FIG. 15, the apparatus may further include:

a model update module 1412 configured to acquire a target attribute information set and a verification label set of verification multimedia resources; the verification multimedia resources being updated and recommended multimedia resources; input the target attribute information set of the verification multimedia resources into the trained multimedia resource classification model to obtain a prediction label set corresponding to the verification multimedia resources; calculate classification accuracy based on the prediction label set and the verification label set that correspond to the verification multimedia resources; and update, in response to the classification accuracy being less than an accuracy threshold, the trained multimedia resource classification model based on the prediction label set corresponding to the verification multimedia resources and the training label set to obtain an updated multimedia resource classification model.

Figure 16:
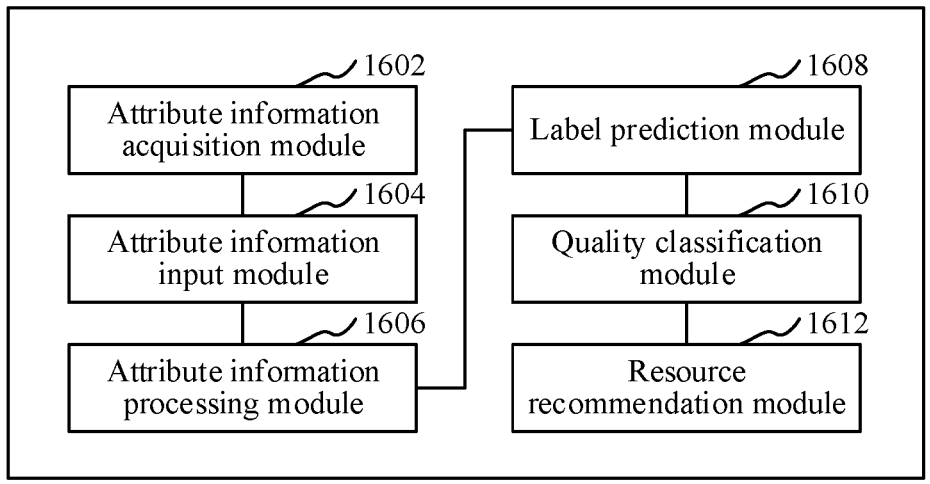
FIG. 16 is a structural block diagram of a multimedia resource recommendation apparatus according to an embodiment of this disclosure.

In an embodiment, as shown in FIG. 16, a multimedia resource recommendation apparatus is provided. The apparatus may use a software module or a hardware module, or a combination of both as part of a computer device. The apparatus may specifically include: an information acquisition module 1602, an attribute information input module 1604, an attribute information processing module 1606, a label prediction module 1608, a quality classification module 1610, and a resource recommendation module 1612.

The attribute information acquisition module 1602 may be configured to acquire a target attribute information set of to-be-recommended multimedia resources. The target attribute information set may include target attribute information corresponding to a plurality of dimensions.

The attribute information input module 1604 may be configured to input the target attribute information set into a trained multimedia resource classification model. The multimedia resource classification model may include a plurality of feature sub-networks and a plurality of task sub-networks.

The attribute information processing module 1606 may be configured to vectorize, using the feature sub-networks in the multimedia resource classification model, target attribute information associated with the feature sub-networks to obtain attribute feature vectors outputted by the feature sub-networks.

The label prediction module 1608 may be configured to input the attribute feature vectors into the task sub-networks to obtain prediction labels outputted by the task sub-networks.

The quality classification module 1610 may be configured to obtain quality classification results corresponding to the to-be-recommended multimedia resources based on the prediction labels.

The resource recommendation module 1612 may be configured to recommend the to-be-recommended multimedia resources based on the quality classification results.

In the above multimedia resource recommendation apparatus, the target attribute information set of the multimedia resources may include target attribute information corresponding to a plurality of dimensions. The target attribute information of different dimensions may reflect content quality of the multimedia resources from different perspectives. The target attribute information set may be inputted into the multimedia resource classification model, and quality of the multimedia resources may be accurately classified using comprehensive consideration of the target attribute information of the dimensions, so as to obtain accurate quality classification results. In addition, the multimedia resource classification model may include a plurality of task sub-networks. The multimedia resource classification model may be a multi-task model and may predict performance of the multimedia resources on the tasks. The quality classification results of the multimedia resources may be obtained by integrating the performance of the multimedia resources on the tasks, which may further improve the accuracy of the quality classification of the multimedia resources. Furthermore, multimedia resources with better quality may be identified using the multimedia resource classification model, so as to recommend the multimedia resources with better quality to the users, which may improve the effectiveness of the multimedia resource recommendation. Effective multimedia resource recommendation may prevent the users' repeated searches or repeated interface refreshes caused by low-quality and ineffective multimedia resource recommendations. The repeated searches or repeated interface refreshes may occupy a large number of resources of a computer device. Therefore, a waste of resources of the computer device may also be reduced on the basis of the improvement of the effectiveness of resource recommendation.

Specific limitations on the multimedia resource classification model training apparatus and the multimedia resource recommendation apparatus may be obtained with reference to the limitations on the multimedia resource classification model training method and the multimedia resource recommendation method hereinabove. The modules in the foregoing multimedia resource classification model training apparatus and multimedia resource recommendation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 17. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. A database of the computer device is used for storing data such as a recommendation interaction information set, a target attribute information set, quality labels, and a multimedia resource classification model of multimedia resources. The network interface of the computer device is configured to communicate with an external terminal using a network connection. The computer-readable instructions, when being executed by the processor, implement a multimedia resource classification model training method and a multimedia resource recommendation method.

In an embodiment, a computer device is provided. The computer device may be a terminal, and an internal structure diagram thereof may be shown in FIG. 18. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless manner may be implemented using WIFI, a carrier network, NFC (Near Field Communication), or other technologies. The computer-readable instructions, when being executed by the processor, implement a multimedia resource classification model training method and a multimedia resource recommendation method. The display screen of the computer device may be a liquid crystal display screen or an electronic ink display screen. The input apparatus of the computer device may be a touch layer covering the display screen, or may be a key, a trackball, or a touch pad disposed on a housing of the computer device, and may further be an external keyboard, a touch pad, a mouse, or the like.

Figure 17:
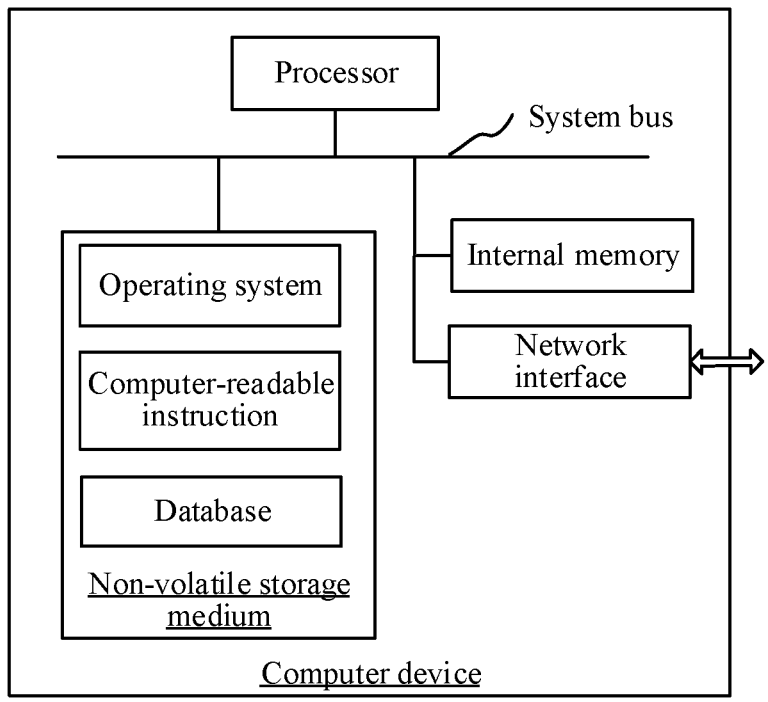
FIG. 17 is a diagram of an internal structure of a computer device according to an embodiment of this disclosure.
Figure 18:
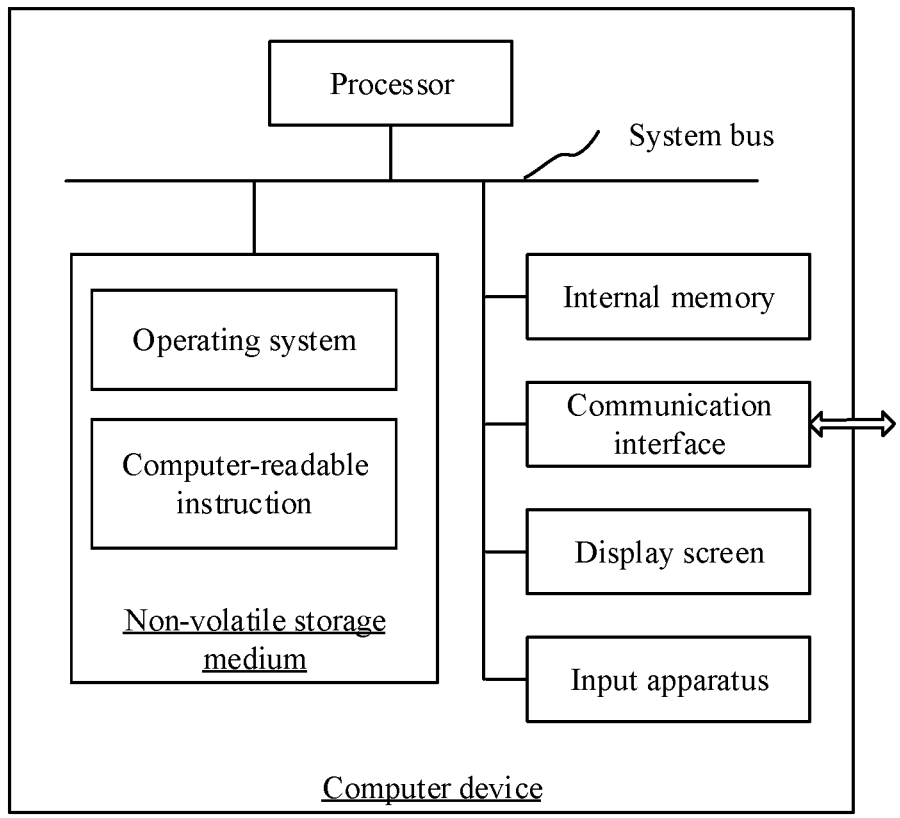
FIG. 18 is a diagram of an internal structure of a computer device according to an embodiment of this disclosure.

A person skilled in the art may understand that the structures shown in FIG. 17 and FIG. 18 are only block diagrams of a partial structure related to the solution of this disclosure, and do not limit the computer device to which the solution of this disclosure is applied. Specifically, the computer device may include more or fewer components than those shown in figures, or some components may be combined, or different component deployment may be used.

In an embodiment, a computer device is provided, including a memory and one or more processors, the memory storing computer-readable instructions, the one or more processors, when executing the computer-readable instructions, implementing the steps in the foregoing method embodiments.

In an embodiment, one or more computer-readable storage media storing computer-readable instructions are provided, the computer-readable instructions, when executed by one or more processors, implementing the steps in the foregoing method embodiments.

In an embodiment, a computer program product or a computer program is provided. The computer program product or the computer program includes computer-readable instructions, and the computer-readable instructions are stored in a computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

For example, a non-transitory computer-readable storage medium may store computer-readable instructions thereon, which, when executed by a computer device, cause the computer device to perform a multimedia resource classification model training method. The multimedia resource classification model training method includes acquiring an attribute information set and a training label set of training multimedia resources. The attribute information set includes attribute information corresponding to a plurality of dimensions. The training label set includes training labels corresponding to a plurality of tasks. The method further includes inputting the attribute information set of the training multimedia resources into a multimedia resource classification model that includes a plurality of feature sub-networks corresponding to the attribute information and a plurality of task sub-networks corresponding to the plurality of tasks. The multimedia resource classification model is configured to classify quality of multimedia resources. The method further includes vectorizing, using the plurality of feature sub-networks, the attribute information to obtain attribute feature vectors outputted by the plurality of feature sub-networks and inputting the obtained attribute feature vectors into the plurality of task sub-networks to obtain prediction labels corresponding to the plurality tasks. The method also includes obtaining a trained multimedia resource classification model by adjusting model parameters of the corresponding task sub-network based on the training label from the corresponding training label set and based on a prediction label that correspond to a same task, and by adjusting model parameters of the corresponding feature sub-networks based on the training labels from the corresponding training label set and based on a prediction labels that correspond to a same tasks until a convergence condition is satisfied.

For example, a non-transitory computer-readable storage medium may store computer-readable instructions thereon, which, when executed by a computer device, cause the computer device to perform a multimedia resource recommendation method. The multimedia resource recommendation method includes acquiring an attribute information set of multimedia resources. The target attribute information set includes target attribute information corresponding to a plurality of dimensions. The method further includes inputting the attribute information set into a trained multimedia resource classification model. The multimedia resource classification model includes a plurality of feature sub-networks and a plurality of task sub-networks. The method further includes vectorizing, using the plurality of feature sub-networks, the attribute to obtain attribute feature vectors outputted by the feature sub-networks and inputting the attribute feature vectors into the task sub-networks to obtain prediction labels outputted by the task sub-networks. The method also includes obtaining quality classification results corresponding to the multimedia resources based on the prediction labels and selectively recommending the multimedia resources based on the quality classification results.

In an exemplary embodiment, a computer program product or a computer program is provided. The computer program product or the computer program includes computer-readable instructions, and the computer-readable instructions are stored in a computer-readable storage medium. A processor of a computer device reads the computer-readable instructions from the computer-readable storage medium, and executes the computer-readable instructions, to cause the computer device to perform all or some steps of the method shown in any embodiment in FIG. 2, FIG. 12, or FIG. 13A.

The foregoing embodiments only describe several implementations of this disclosure, and their description is relatively specific and detailed, but cannot be construed as a limitation to the patent scope of this disclosure. For a person of ordinary skill in the art, several transformations and improvements can be made without departing from the idea of this disclosure. These transformations and improvements belong to the protection scope of this disclosure. Therefore, the protection scope of this disclosure is subject to the protection scope of the appended claims.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A multimedia resource classification model training method, comprising:
    acquiring an attribute information set and a training label set of training multimedia resources, the attribute information set comprising attribute information corresponding to a plurality of dimensions, and the training label set comprising training labels corresponding to a plurality of tasks, the training labels indicating a quality of corresponding training multimedia resources;
    inputting the attribute information set of the training multimedia resources into a multimedia resource classification model comprising a plurality of feature sub-networks corresponding to the attribute information and a plurality of task sub-networks corresponding to the plurality of tasks;
    vectorizing, using the plurality of feature sub-networks, the attribute information to obtain attribute feature vectors outputted by the plurality of feature sub-networks;
    inputting the obtained attribute feature vectors into the plurality of task sub-networks to obtain prediction labels corresponding to the plurality of tasks; and
    obtaining a trained multimedia resource classification model by adjusting model parameters of one of the task sub-networks based on a training label from the training label set and based on a prediction label that correspond to a task associated with the one of the task sub-networks, and by adjusting model parameters of one of the feature sub-networks based on the training label and the prediction label that correspond to the task until a convergence condition is satisfied.

2. The method according to claim 1, wherein the acquiring the training label set of training multimedia resources comprises:
    acquiring recommendation interaction information sets corresponding to a plurality of historical multimedia resources, wherein each of the recommendation interaction information sets comprises recommendation interaction information corresponding to the plurality of tasks;
    obtaining reference interaction information corresponding to the plurality of tasks by calculating statistics using the recommendation interaction information corresponding to a same task;
    obtaining quality label sets corresponding to the plurality of historical multimedia resources by classifying quality of the plurality of historical multimedia resources based on the recommendation interaction information and based on the corresponding reference interaction information; and
    obtaining the training multimedia resources and the corresponding training label set based on the plurality of historical multimedia resources and based on the corresponding quality label sets.

3. The method according to claim 2, wherein the classifying comprises:
    comparing a recommendation interaction degree corresponding to the recommendation interaction information and a reference interaction degree corresponding to the reference interaction information of a same task, wherein the recommendation interaction degree is determined by normalizing the recommendation interaction information, and wherein the reference interaction degree is determined by normalizing the reference interaction information;
    determining a quality label of the task corresponding to the recommendation interaction information having recommendation interaction degree greater than the reference interaction degree to be a positive label; and
    determining a quality label of the task corresponding to the recommendation interaction information having recommendation interaction degree less than or equal to the reference interaction degree to be a negative label.

4. The method according to claim 1, wherein the plurality of feature sub-networks comprises a text feature sub-network, and wherein attribute information associated with the text feature sub-network comprises a plurality of elements of text attribute information, and wherein the text feature sub-network further comprises a plurality of data processing channels respectively corresponding to the plurality of elements of text attribute information.

5. The method according to claim 4, wherein the vectorizing comprises:
    vectorizing, using the plurality of data processing channels in the text feature sub-network, the corresponding text attribute information to obtain text feature vectors outputted by the plurality of data processing channels; and
    obtaining an attribute feature vector outputted by the text feature sub-network based on the text feature vectors.

6. The method according to claim 1, wherein the plurality of feature sub-networks comprise an atomic feature sub-network and wherein the vectorizing comprises:
    performing, using the atomic feature sub-network, feature crossing on attribute information associated with the atomic feature sub-network to obtain at least one cross feature vector; and
    obtaining an attribute feature vector outputted by the atomic feature sub-network based on the at least one cross feature vector.

7. The method according to claim 6, wherein the attribute information associated with the atomic feature sub-network comprises at least two of user attribute information, image attribute information, language attribute information, and text statistics attribute information.

8. The method according to claim 1, wherein the plurality of feature sub-networks comprises an image-text fusion feature sub-network, wherein attribute information associated with the image-text fusion feature sub-network comprises text attribute information and image attribute information, and wherein the image-text fusion feature sub-network comprises a text data processing channel corresponding to the text attribute information and an image data processing channel corresponding to the image attribute information.

9. The method according to claim 8, wherein the vectorizing comprises:
    encoding the text attribute information using the text data processing channel to obtain an intermediate feature vector;

encoding the image attribute information using the image data processing channel to obtain an image feature vector;

performing attention allocation on the intermediate feature vector based on the image feature vector to obtain a first image-text fusion feature vector;

performing attention allocation on the image feature vector based on the intermediate feature vector to obtain a second image-text fusion feature vector; and obtaining an attribute feature vector outputted by the image-text fusion feature sub-network based on the first image-text fusion feature vector and the second image-text fusion feature vector.

10. The method according to claim 9, wherein the encoding the text attribute information comprises:

performing word encoding on the text attribute information to obtain a word feature vector; and performing statement encoding on the word feature vector to obtain the intermediate feature vector.

11. The method according to claim 1, wherein the plurality of feature sub-networks comprises a style feature sub-network, wherein attribute information associated with the style feature sub-network comprises style attribute information, and wherein the style feature sub-network comprises a first data processing channel and a second data processing channel.

12. The method according to claim 11, wherein the vectorizing comprises:

encoding the style attribute information using the first data processing channel to obtain an initial feature vector;

performing attention allocation on the initial feature vector to obtain a first feature vector;

performing convolution of the style attribute information using the second data processing channel to obtain a second feature vector; and obtaining an attribute feature vector outputted by the style feature sub-network based on the first feature vector and the second feature vector.

13. The method according to claim 1, wherein each of the plurality of task sub-networks comprises an expert layer, a gating layer, and a fusion layer; and wherein each of the plurality of task sub-networks share the expert layer.

14. The method according to claim 13, wherein the inputting the obtained attribute feature vectors comprises:

performing feature processing on the obtained attribute feature vectors using the expert layer in a current task sub-network to obtain feature processing results;

weighting the feature processing results using the gating layer to obtain intermediate processing results; and fusing the intermediate processing results using the fusion layer to obtain the prediction label of the task corresponding to the current task sub-network.

15. The method according to claim 1, further comprising:

acquiring an attribute information set and a verification label set of verification multimedia resources, wherein the verification multimedia resources comprise updated and recommended multimedia resources;

inputting the attribute information set of the verification multimedia resources into the trained multimedia resource classification model to obtain a prediction label set corresponding to the verification multimedia resources;

calculating classification accuracy of the trained multimedia resource classification model based on the prediction label set and the verification label set corresponding to the verification multimedia resources;

determining if the calculated classification accuracy is below a predetermined accuracy threshold; and updating, in response to determining that the calculated classification accuracy being is below the predetermined accuracy threshold, the trained multimedia resource classification model based on the prediction label set corresponding to the verification multimedia resources and based on the training label set.

16. A multimedia resource recommendation method, comprising:

acquiring an attribute information set of multimedia resources comprising attribute information corresponding to a plurality of dimensions;

inputting the attribute information set into a trained multimedia resource classification model comprising a plurality of feature sub-networks and a plurality of task sub-networks;

vectorizing, using the plurality of feature sub-networks, the attribute information to obtain attribute feature vectors outputted by the feature sub-networks;

inputting the attribute feature vectors into the task sub-networks to obtain prediction labels outputted by the task sub-networks;

obtaining classification results corresponding to the multimedia resources based on the prediction labels via the trained multimedia resource classification model in which model parameters of one of the task sub-networks are adjusted based on a training label from a training label set and based on a prediction label, and model parameters of one of the feature sub-networks are adjusted based on the training label and the prediction label that correspond to the task until a convergence condition is satisfied; and selectively recommending the multimedia resources based on the classification results.

17. A multimedia resource classification model training apparatus, comprising:

one or more processors configured to:

acquire an attribute information set and a training label set of training multimedia resources, wherein the attribute information set comprises attribute information corresponding to a plurality of dimensions, and wherein the training label set comprises training labels corresponding to a plurality of tasks, the training labels indicating a quality of corresponding training multimedia resources;

input the attribute information set into a multimedia resource classification model; comprising a plurality of feature sub-networks and a plurality of task sub-networks corresponding to the plurality of tasks;

vectorize, using the plurality of feature sub-networks, attribute information to obtain attribute feature vectors outputted by the plurality of feature sub-networks;

input the attribute feature vectors into the plurality of task sub-networks to obtain prediction labels corresponding to the plurality of tasks; and obtain a trained multimedia resource classification model by adjusting model parameters of one of the task sub-networks based on a training label from the training label set and based on a prediction label that correspond to a same task associated with the one of the task sub-networks, and by adjusting model parameters of one of the feature sub-networks based on the training label and the prediction label that correspond to the task until a convergence condition is satisfied.

18. The apparatus according to claim 17, wherein the one or more processors are is further configured to:
acquire recommendation interaction information sets corresponding to a plurality of historical multimedia resources, wherein each of the recommendation interaction information sets comprises recommendation interaction information corresponding to the plurality of tasks;
obtain reference interaction information corresponding to the plurality of tasks by calculating statistics using the recommendation interaction information corresponding to a same task;
obtain quality label sets corresponding to the plurality of historical multimedia resources by classifying quality of the plurality of historical multimedia resources based on the recommendation interaction information and based on the corresponding reference interaction information; and
obtain the training multimedia resources and the corresponding training label set based on the plurality of historical multimedia resources and based on the corresponding quality label sets.

19. The apparatus according to claim 18, wherein the one or more processors are further configured to:
compare a recommendation interaction degree corresponding to the recommendation interaction information and a reference interaction degree corresponding to the reference interaction information of a same task, wherein the recommendation interaction degree is determined by normalizing the recommendation interaction information, and wherein the reference interaction degree is determined by normalizing the reference interaction information;
determine a quality label of the task corresponding to the recommendation interaction information having recommendation interaction degree greater than the reference interaction degree to be a positive label; and
determine a quality label of the task corresponding to the recommendation interaction information having recommendation interaction degree less than or equal to the reference interaction degree to be a negative label.

20. The apparatus according to claim 17, wherein
the plurality of feature sub-networks comprises a text feature sub-network, and wherein attribute information associated with the text feature sub-network comprises a plurality of elements of text attribute information, and wherein the text feature sub-network further comprises a plurality of data processing channels respectively corresponding to the plurality of elements of text attribute information, and
the one or more processors are is further configured to:
vectorize, using the plurality of data processing channels in the text feature sub-network, the corresponding text attribute information to obtain text feature vectors outputted by the plurality of data processing channels; and
obtain an attribute feature vector outputted by the text feature sub-network based on the text feature vectors.

* * * * *